(12) United States Patent
Yevskyy et al.

(10) Patent No.: US 8,472,674 B2
(45) Date of Patent: Jun. 25, 2013

(54) METHOD OF SURFACE SEISMIC IMAGING USING BOTH REFLECTED AND TRANSMITTED WAVES

(76) Inventors: Naum Marmal Yevskyy, Kiev (UA); Zynoviy Gornyak, Kiev (UA); Alexander Kostyukevch, Calgary (CA); Yuri Roganov, Kiev (UA); Victor Mershchiy, Kiev (UA)

( * ) Notice: Subject to any disclaimer, the term of this patent is extended or adjusted under 35 U.S.C. 154(b) by 665 days.

(21) Appl. No.: 12/525,475

(22) PCT Filed: Feb. 5, 2008

(86) PCT No.: PCT/CA2008/000226
§ 371 (c)(1),
(2), (4) Date: Mar. 18, 2010

(87) PCT Pub. No.: WO2008/095289
PCT Pub. Date: Aug. 14, 2008

(65) Prior Publication Data
US 2010/0183198 A1    Jul. 22, 2010

Related U.S. Application Data

(60) Provisional application No. 60/899,901, filed on Feb. 6, 2007.

(51) Int. Cl.
*G06K 9/00*    (2006.01)

(52) U.S. Cl.
USPC .......................................................... 382/109

(58) Field of Classification Search
USPC .............. 73/152.01–152.05, 784; 348/85–88; 356/241.1–241.4; 367/9–21
See application file for complete search history.

(56) References Cited

U.S. PATENT DOCUMENTS
5,812,493 A * 9/1998 Robein et al. ................... 367/25
* cited by examiner

*Primary Examiner* — Atiba O Fitzpatrick
(74) *Attorney, Agent, or Firm* — Sean W. Goodwin

(57) ABSTRACT

Reflected-transmitted non-converted and converted seismic waves as used for seismic imaging which is not limited by the angle of inclination of the seismic interfaces. These wave signals are recorded at the surface and are later used to obtain seismic imaging of geological discontinuities and the physical properties of the medium. Known duplex waves are used with transmitted waves for obtaining seismic images from much wider angles, ranging from horizontal to vertical. Two types of migration procedures are used: the first one being based on migration of transmitted compressional and converted duplex waves, and the second one being based on the joint migration of two interrelated fields, such as interferometric principles; for example, the first field of primary waves corresponding to the one time reflected monotypic compressional (non-converted) type of waves and a second wavefield corresponding to secondary waves of more complex origin, such as reflected waves and converted waves.

2 Claims, 13 Drawing Sheets

Figure 5

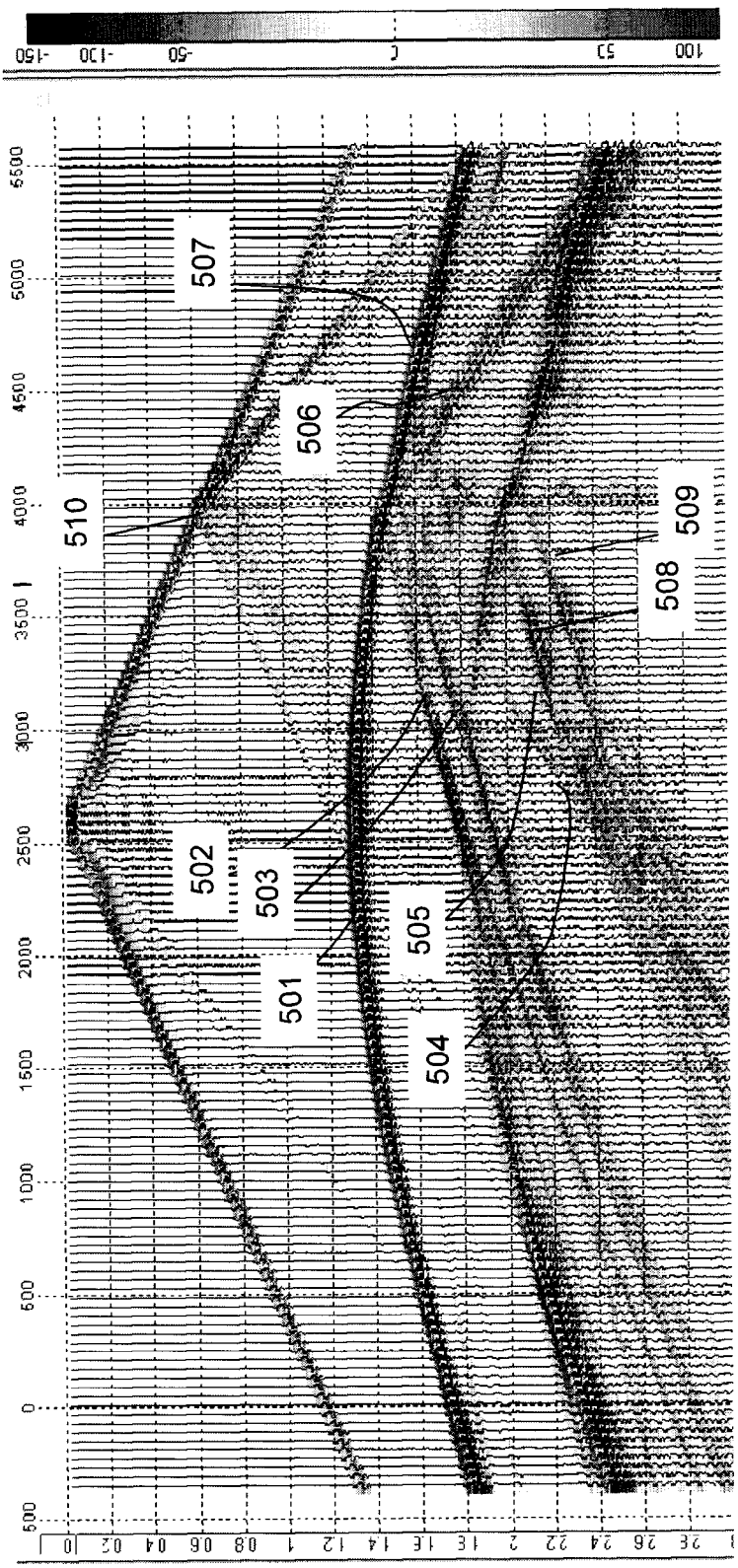

501 – reflection from horizontal base-boundary; 502 – compressional wave, reflected from the thin vertical layer border nearest the source location; 503 – compressional wave, reflected from the border farthest from the source location; 504 – converted duplex wave, reflected from the border nearest to the source location; 505 – converted duplex wave, reflected from the border farthest from the source location; 506 – transmitted converted duplex wave; 507 – transmitted compressional duplex wave; 508 and 509 – are duplex waves produced by a converted wave that changed polarization on the base-boundary; and
510 – transmitted and reflected waves from the top of the thin vertical layer as a result of incidence of the initial source wave.

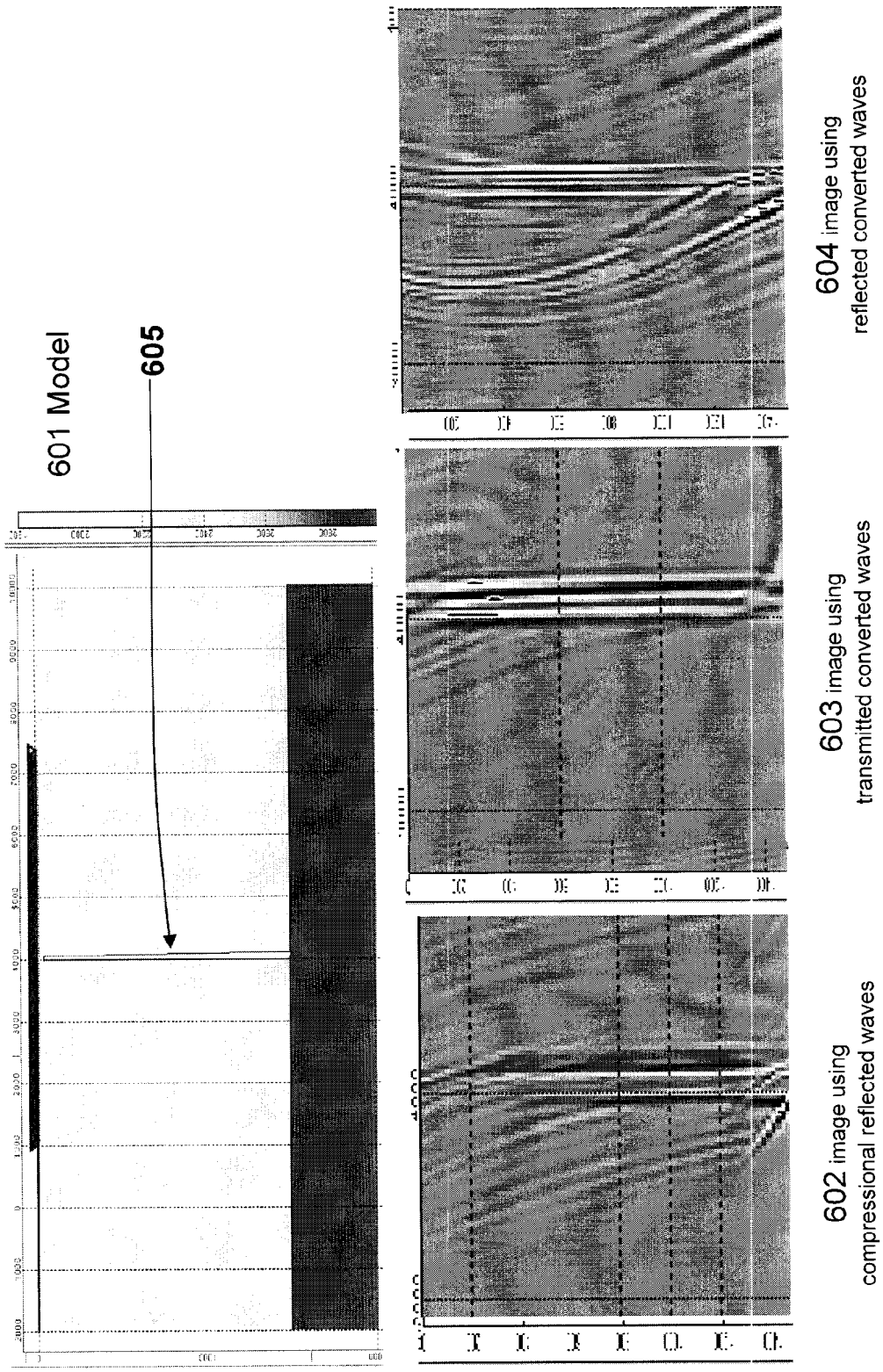

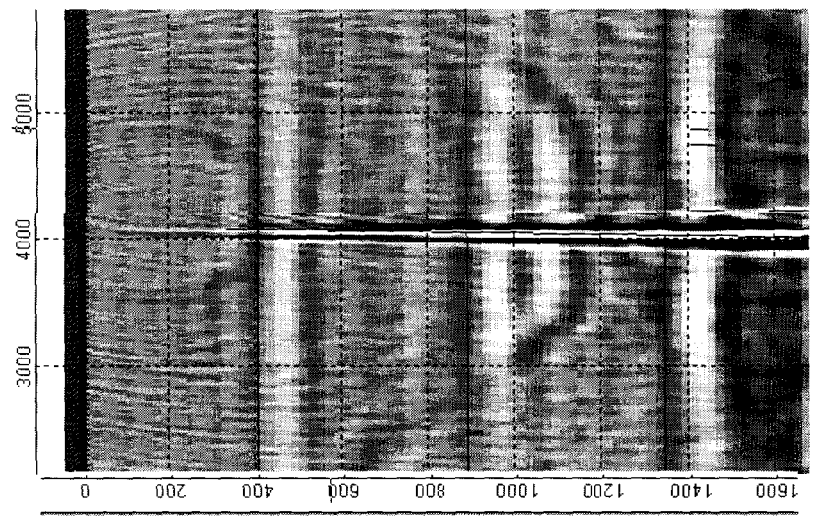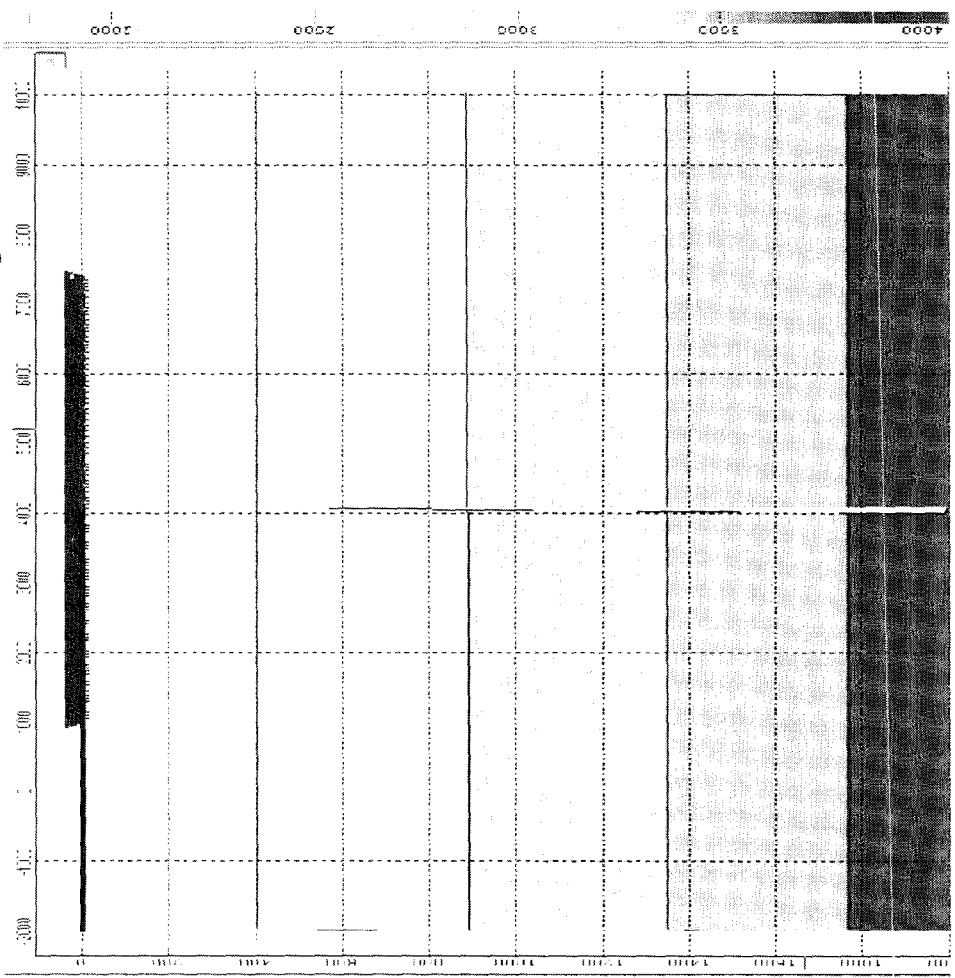
Figure 7
702 image of modeled dike constructed using transmitted converted duplex waves
701 model of upward-thinning dike and a number of horizontal discontinuities

Figure 9

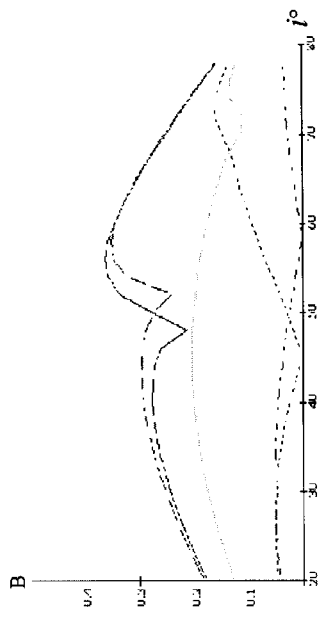

901 graphs of transmission coefficient for compressional waves

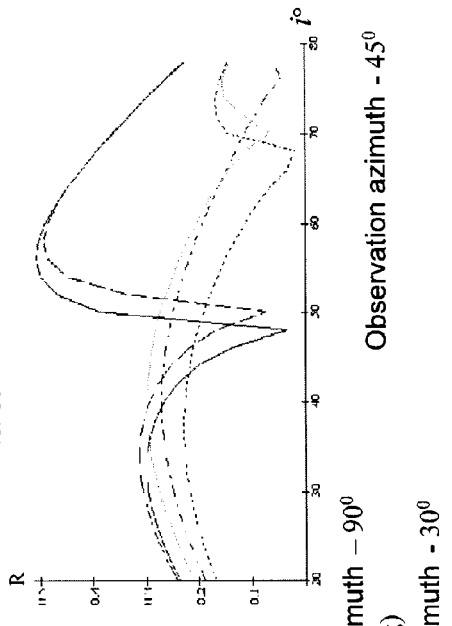

902 graphs of reflection coefficient for compressional waves

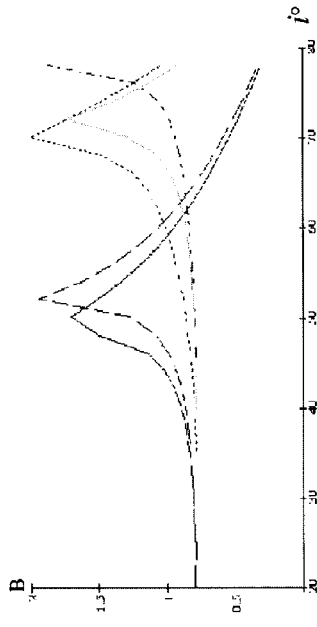

903 graphs of transmission coefficient for converted PS-waves

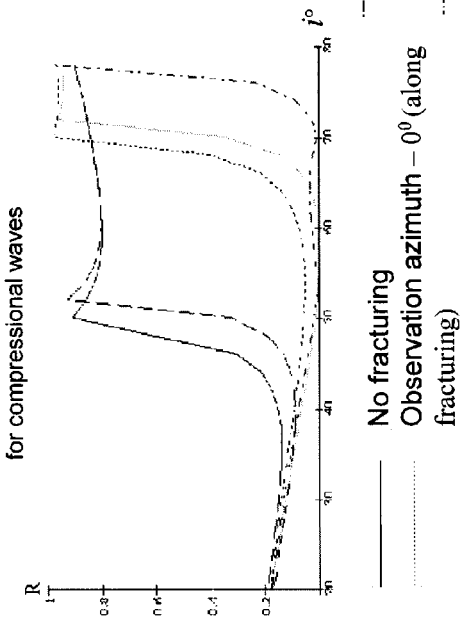

904 graphs of reflection coefficient for converted PS-waves

— — — No fracturing
——— Observation azimuth – $0^0$ (along fracturing)
– – – Observation azimuth – $90^0$ (across fracturing)
········· Observation azimuth – $30^0$
– · – · – Observation azimuth – $45^0$ creation transmitted and reflected compressional and converted PS-waves Model of a Point Deflector

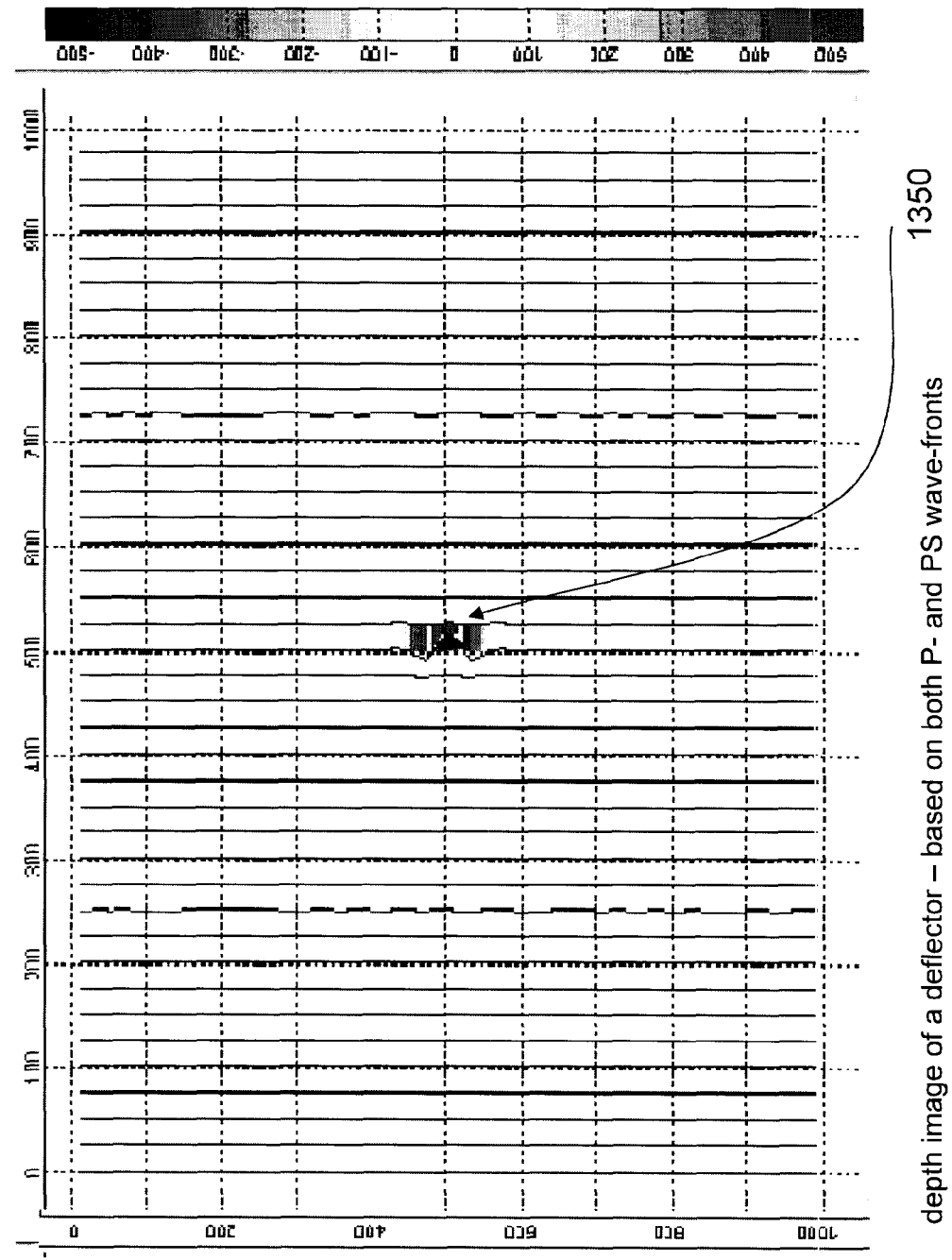

METHOD OF SURFACE SEISMIC IMAGING USING BOTH REFLECTED AND TRANSMITTED WAVES

FIELD OF THE INVENTION

The invention relates generally to surface seismic data processing and more particularly, to seismic imaging that does not limit the angle of inclination of the seismic interfaces, and estimation of Poisson's ratio and fracture parameters in geological interface contacts without limiting the angle of inclination of these contacts. Two types of migration procedures are implemented: based on migration of transmitted and converted duplex waves, and based on the joint migration of compressional and converted duplex waves.

BACKGROUND OF THE INVENTION

Conventional seismic data processing methods are based on detecting primary reflections using a line (2D) or a grid (3D) of receivers placed on or near the surface of a zone of interest. The position of each receiver in the group is known relative to a source of seismic energy, which when triggered creates mechanical waves, which in turn activate electromechanical transducers that are an element of each receiver. These mechanical waves can activate one or more transducers while outbound from the source, again upon a first reflection from a subsurface element or boundary (event), and upon one or more secondary or tertiary reflections. Electro-magnetic signals generated by the transducers are recorded or "gathered" (i.e. creating a seismogram), to represent the primary reflected waves, are then position corrected or "migrated", and later "stacked" with sibling signals recorded by the same receiver during subsequent activations of the same source in order to reduce the influence of transient noise. Using any of a number of available algorithms that accept the primary signals as data, the gathers are processed to generate images that readily reveal generally horizontal surfaces or interfaces at different depths that represent layers against which the primary waves were at different times reflected and through which those waves travel at different velocities that are characteristic of the composition of those layers.

It is well understood that information respecting primary reflections arriving at different receivers at different times from each of such multiple surfaces (subhorizontal events) can be coordinated and interpreted to accurately identify subsurface reflectors that are oriented somewhat vertically (known as subverticals), but only to within a limited range of angles (normally less than 60 degrees). For such mildly vertical reflectors this extrapolation technique using primary reflections is adequately developed, including the filtering out of more complex double reflections and ignoring as noise their influence on the resulting image. However, for steeply sloping reflectors, outside such limited range, primary reflections are insufficient to generate unambiguous images revealing their existence, position, and orientation with an acceptable level of certainty.

The development of migration procedures in recent years has permitted increased accuracy in mapping of areas with complex geology, including areas having salt domes. However, precise delineation of salt stocks, tracing of faults, and other problems connected with near-salt sediments, often still result in ambiguous solutions likely because the sub-vertical reflecting boundaries have rugose surfaces. Waves reflected only once from such boundaries, tend not to reach the surface and have been studied using "vertical seismic profiles" (VSP) according to which seismic images are created using a special migration transformation. However, the practical efficiency of such an approach is limited, because in the boreholes, such reflections can only be recorded within depth intervals deeper than the target boundary. However, some seismic waves can be reflected by sub-vertical faces of salt stocks and subsequently by sub-horizontal boundaries in adjacent sediments, permitting them to be recorded on the surface if they have enough energy to be identified against the background of other reflections. In Russia and other parts of the world, such waves have received the name "duplex", i.e. having undergone two reflections during their propagation. Duplex waves can be formed not only under conditions of salt dome tectonics, but also in case of small-displacement faults, when the acoustic properties of the latter contrast significantly with those of host rock. This commonly happens when the subject fault is a tectonic element of a hydrocarbon trap and, therefore, the epigenetic alterations associated with the deposit result in a significant acoustic contrast across the dislocation zone. Consequently, while it is difficult to use phase-shift analysis (because of the low resolving power of known conventional seismic processing methods) duplex waves can in theory also be used to identify and trace faults with small displacements.

McMchan, G. A. (in his 1983 Article, Migration by extrapolation of time-depended boundary values: Geophys. Prosp., 31, 412-420) describes imaging vertical boundaries based on reverse time migration, however according to that method all the primary reflections were removed from the gathers, which is not realistic in processing actual seismic data.

However, in 2003 U.S. Pat. No. 7,110,323 B2, Marmalyevskyy et al teach Duplex Wave Migration ("DWM"), which allows one to build images, without preliminarily removing primary reflections, of other sources Duplex waves, as that term is used in U.S. Pat. No. 7,110,323, are the reflected portion of a source wave (whether pressure or shear) that has experienced two collisions with geologic events (e.g. a discontinuity) from which the second collision returns coherent (i.e. spatially and temporally correlated) seismic energy to the surface for observation. The collision of the source wave on the first geologic event (whether sub-horizontal or sub-vertical) generates 4 secondary waves (reflected-P, reflected-S, transmitted-P, and transmitted-S) only 2 of which (reflected-P and reflected-S) are used in the DWM method, while the 2 transmitted secondary waves are ignored or filtered out. The reflected-P and reflected-S secondary waves then each propagate to collide with a second geologic event (typically the inverse of the first collision, i.e. sub-vertical or sub-horizontal) where 4 tertiary waves arise from each of the 2 secondary waves. Again, the signal of waves transmitted through the second event are either ignored or filtered out, but the reflected-P and reflected-S pairs of tertiary waves (arising from each of those 2 secondary waves) are observed at the surface and used in the DWM method to interpret the subsurface geology. The method of DWM reduces the calculation required to a problem of finding only one secondary source, after using conventional primary reflections and methods as input to find the first of the two secondary sources. Duplex waves are a reflected type of twice coherently deflected wave that are important but not unique to surface seismic methods. DWM is a migration procedure that allows imaging sub-vertical boundaries (such as: salt dome walls, boundaries of geological blocks, and small amplitude faults) without first removing primary reflections and where only duplex waves are used since they produce better images of steeply dipping sub-vertical boundaries typically having dip-angles in the range 60 to 90 degrees.

During modern VSP observations both converted and monotypic transmitted waves are recorded and used in many ways (e.g. define the elastic parameters of the medium, fracturing systems, absorption, signal shapes and geometry of boundaries, et cetera).

In VSP, transmitted converted waves are used for imaging without limiting the angle of inclination of the seismic boundaries. Xiao et al. (in article: Xiao, X., Zhou, M., and Schuster, G. T., 2007, Salt-flank delineation by interferometric imaging of transmitted P- to S-waves: Geophysics, 71, S1197-S1207) have shown the possibility of obtaining interferometric images of transmitted waves so as to delineate the flanks of salt domes. They used principle of stationary-phase migration by Schuster (is shown in his 2001 Article, Thyory of daylight/interferometric imaging: 63th Annual Conference and Exhibition, EAGE, Expanded Abstracts, A32) with cross-correlation between the PS and PP transmitted arrivals before phase shift.

Niheil et al, (in their 2000 Article, VSP fracture imaging with elastic reverse-time migration: 70th SEG Annual International Meeting, Expanded Abstracts) also applied interferometric principles for formation of seismic images in a wide band of angles of boundaries' inclinations. They used the RTM of VSP data to produce images of both vertical fractures and horizontal boundaries. They modified the RTM algorithm in such a way that instead of forward continuation of a compressional wave-field from a source, they used the backward continuation of down going compressional wave registered at VSP receivers.

However, transmitted waves within framework of the interferometric approach are not used in any known method of the surface seismic surveys. In difference from VSP at realization of interferometric principle for the surface seismic surveys allowing obtaining seismic images without restriction on boundaries' inclination angles, in addition to once reflected the PS and PP waves also necessary to use the duplex waves changing their modes at reflection and transmitting through those heterogeneities.

Well known techniques, such as AVO Analysis (Ostrander, 1985), use the dependence of the reflection coefficient to the angle of incidence to predict the gas saturation of rocks. However, in complex geological conditions, the obtained information from reflected waves is not enough for a confident interpretation of gas saturation.

Disadvantageously, duplex wave migration procedures that are based only on reflected waves are somewhat restricted to imaging sub-vertical boundaries with dip-angles ranging from 60-90 degrees from the horizontal axis. In VSP other types of waves are used, such as transmitted converted and non-converted waves, which allow imaging boundaries ranging from 0-90 degrees from the horizontal axis. These waves also help define elastic parameters of the medium, fracture systems, absorption, signal shapes and geometry of boundaries, etc. In surface seismic these waves are not traditionally used such that it would be valuable to find a way to use transmitted converted and non-converted waves in duplex wave migration.

The prior art in the surface seismic data processing industry has concentrated on teaching variations on methods of using reflected waves, when dealing with complex geologic media it would be advantageous to also have a method for using the information available in transmitted waves, particularly for gas saturation forecasting this would be a great advantage.

SUMMARY OF THE INVENTION

The method of the present invention deals with information from a different type of wave than has been taught in any surface seismic prior art identified to date, by using transmitted waves (both converted and monotypic) one can image boundaries ranging from 0-90-0 degrees.

This invention concerns surface-seismic and VSP data processing especially seismic imaging of wide dip-angle boundaries using both compressional and converted reflected and transmitted waves, including duplex waves. We also determine Poisson's ratio and fracture parameters on geological contacts based on migration of reflected, non-converted and converted duplex waves. In order to overcome the limitations of the existing methods that only use reflected waves, we also use transmitted non-converted and converted waves for imaging purposes. A new method described here is the pre-stack migration of transmitted duplex waves for elastic parameters definition and for imaging dip-angle boundaries without dip-angle restrictions. The method of the invention is implemented using 2D and 3D seismic datasets. Shot and cable location as well as main sub-vertical structural horizons and boundaries are used as input data. Other than in surface seismic data, duplex reflected and transmitted waves are also recorded in VSP and used for seismic imaging. In addition to this, migration of conventional transmitted waves on VSP datasets is used for seismic imaging without dip-angle restrictions. Migration of duplex waves is a procedure based on the wave equation solution, to create a depth seismic image from wave-fields (Time functions recorded on the surface or/and inside the wells by geophones). 2D and 3D duplex migration of surface seismic and VSP measurements are distinguished. An initial velocity model of the media is needed for migration, this is the same model used for conventional pre-stack depth migration. Special separation of the different types of duplex waves for duplex migration of surface and VSP data is not required. According to DWM together with migration of transmitted waves, "i" and "p" waves are also distinguished. When migrating "i" waves common shot gathers are typically used, whereas common receiver gathers are used to migrate "p" waves. To determine the parameters of the medium use migration of offsets, selected from seismic gathers and considering the location of sub vertical contacts as well as constant-offset seismograms.

When a wavefront from a seismic source strikes an interface (sometimes called an "event") between geologic media, some energy is reflected while some energy transmits through the interface. The reflected energy is partitioned into "P" (i.e. pressure) type waves and "S" (i.e. shear) type waves. Similarly, the energy transmitted through the interface is partitioned into P and S type waves. On each collision four waves result: Reflected shear: $S_{refl}$, Reflected pressure: $P_{refl}$, Transmitted shear: $S_{trans}$, and Transmitted pressure: $P_{trans}$. There is also some conversion of energy from P-wave to S-wave type, in both the reflected and transmitted energy. It is well-known that there is a velocity difference between the P and S waves, which is useful since typical sedimentary rocks have a VP/VS ratio of between 1.5-2.5. There is also a difference in the direction of motion relative to the direction of wave propagation. P-waves have particle motion in the same direction as wave propagation, while shear waves have particle motion in a direction perpendicular to the direction of wave propagation. With Duplex Migration one can use waves of different types such as: reflected non-converted (compressional P and shear S), transmitted non-converted, reflected converted and transmitted converted. Seismic imaging also using transmitted wave types allows the solution of more geological tasks using duplex wave migration.

In summary - surface observation includes multi-component receiving of seismic signals and because of a low velocity zone (LVZ) all waves propagate sub-vertically to the observation surface. As a result, on Z- component there will be recorded P-waves, on an X-component - SV-waves and on a Y-component - SH-waves. The Z-and X-components are considered. Transmitted converted waves are recorded on the X-component and it is possible to continue them back up to discontinuities in which they were formed. It is enough to have a velocity model above these points and it is not essential to know velocities in the lower part where the first reflection was. For the same reason we do not need velocities on a site from the source point up to the primary reflection; specifically the requirement for velocity model and heterogeneities decrease. Now, to consider transmitted compressional waves, recorded on Z-component, their properties include: on target discontinuities where there was conversion, time of arrival of compressional waves will coincide with time of arrival of shear (converted) waves. Thus, if we downward continue wave-fields of Z- and X-component (common shot gather) and at each level Zi apply mutual correlation of the continued fields, the last will produce the image of discontinuity at a corresponding level. In the formation of such an image, all types of compressional and converted waves, as duplex monotypic and converted, as well as reflected-transmitted monotypic and converted will be automatically used. Also, the image from primary reflected converted waves, used in conventional processing, will be formed, because in points of conversion the same property of division of waves on compressional and shear is applied. If, instead of X-components of a wave-field, we use Y-component, the image on fast shear (SH) waves will be obtained.

Discontinuities for which the image on fast shear (SH) waves is formed are characterized by fracturing - for which the normal to a surface of fractures does not coincide with a normal to surface of the discontinuity. The transmitted converted waves propagating from below off numerous boundaries will repeatedly amplify the image of the target boundary. Thus primary waves and those reflected multiple times from the discontinuities located below a point of construction of the image will participate in its formation. Those waves that were converted on the discontinuity but reach the reception point from below as compressional, also participate; the same for conventional converted waves. In a point (Xv, Zv) of vertical boundary the image will be formed using 4 types of waves $P_1S_1$, $P_1P_1$, $P_1P_2$, $P_1S_2$. A major advantage of the new technique is that, unlike earlier approaches, determining the base boundary is not needed.

When on Z- and X-components are recorded compressional and slow shear (SV) waves, or in case of other type of division of specified waves, the formation of seismic images on the reflected and transmitted converted waves, can be described by following operations:

To continue a wave-field recorded on X-component of a wave-field, on level Zi where i=1,n with use of the velocity characteristic of shear waves and to obtain field Uxi;

To continue a wave-field recorded on Z-component of a wave-field, on level Zi where i=1,n with use of the velocity characteristic of compressional waves and to obtain field Uzi;

To obtain the seismic image at level Zi to receive by correlation of wave-fields Uxi and Uzi;

Transition to next depth level; and

To complete seismic image on SV shear wave, perform steps 1-4 at all levels from 1 to n.

When on Z- and Y-components are accordingly recorded compressional and fast shear (SH) waves, or in case of other type of division of the specified waves, for construction of the image on reflected and transmitted shear SH waves need to repeat steps 1-5, having replaced the X-component of a wave-field on Y-component.

In accordance with the method of the invention, in transmitted-reflected wave migration ("TWM"), transmitted waves are used in surface seismic for the first time and in a manner that expands the information base available to those engaged in seismic prospecting so as to result in the following advantages: it is now possible to produce images of boundaries at almost any angle of inclination using information about reflected reflected-transmitted waves (combined with velocity and other standard geologic information) processed using continuation and correlational procedures; when forming images of elongate small-amplitude geologic discontinuities (such as faults, zones of fracturing, dykes, etc) transmitted-reflected wave migration procedures extract information from the fact that conversion can occur as transmitted waves pass through such discontinuities; and the new migration procedure based on transmitted-reflected waves is also more efficient than conventional methods because it takes into account more of the parameters that define the physical properties of geologic formations.

Further, example applications for and advantages of the method of the invention include: forecast the presence of gas deposits in vertical contacts, in particular, salt domes and clastic deposits, improve the reliability and stability of imaging boundaries near a salt dome, expand the dip-angle imaging range from horizontal to vertical boundaries, improve efficiency in forecasting gas saturation in isotropic formations, improve efficiency in forecasting fractured reservoirs by using reflected-transmitted converted waves in azimuthal seismic observations.

According to one aspect of the invention, there is provided a method of processing seismic data from an array of receivers on the surface of a formation having at least one base-boundary and a first and second media with a source located over said first media, for imaging a sub vertical interface between said first and second media, the method comprising the steps: i) select a common shot gather; ii) downward continue the transmitted compressional wave-field of said gather using the compressional wave velocities of the second media; iii) calculate the arrival times of the reflected wave from said base-boundary, using the compressional wave velocities of the first media; iv) create a first seismic image on each level Zi by selecting the values from said continued wave-field, corresponding to said arrival times; v) downward continue the transmitted converted wave-field of said gather using the shear wave velocities of the second media; vi) calculate the arrival times of the reflected wave from said base-boundary, using the compressional wave velocities of the first media; vii) create a second seismic image on each level Zi by selecting the values corresponding to the arrival times of the reflected wave from the base-boundary; and viii) compare said first and second seismic images to interpret the location of the vertical interface between said first and second media.

BRIEF DESCRIPTION OF THE DRAWINGS

The present invention, in order to be easily understood and practiced, is set out in the following non-limiting examples shown in the accompanying drawings, in which:

FIG. 5 illustrates a seismogram of duplex waves formed in a thin vertical layer;

FIG. 6 illustrates a model of a thin vertical layer and three different seismic images formed using different types of duplex waves, namely: reflected compressional, transmitted converted, and reflected converted;

FIG. 7 illustrates a model and the resulting image for the example of horizontal and vertical layers using duplex migration of transmitted waves (1-way travel time);

FIG. 9—using 4 color-coded graphs—illustrates the dependence of reflection and transmission coefficients (of non-converted compressional waves and converted PS-waves) on the angle of incidence of such waves to a boundary between a shearly isotropic and a vertically fractured media;

FIG. 13 illustrates a depth image, of a deflecting point (like that modeled in FIG. 11) obtained using the method of the invention taking into account the information in both non-converted PP and converted PS wave-fronts (like those of FIG. 12);

DETAILED DESCRIPTION OF THE PREFERRED EMBODIMENTS

The method of present invention is based on two types of migration. The first type uses a base boundary and builds an image using waves that first reflected from this boundary and then underwent deflection (reflection or transmission) on various non-homogeneities located between the surface and that base boundary. The second type of migration uses two wave-fields (P and S) that mutually form each other and are deflected in one and the same points. These waves change type or "convert" when they deflect from such non-homogeneities. Using such converted waves, migration for surface seismic based on transmitted and reflected waves is now possible, regardless of the angle of the deflecting boundary.

Whenever the terms "downward continue" or "continuation" are used herein, wave-field downward continuation can be performed with any of the well-known algorithms such as: wave-field solution in the spectral domain, finite-difference solution of the one-way and two-way (Reverse Time) wave equation, Kirchhoff integral approach, et cetera.

The principle of seismic imaging from a downward continued wave-field (wave migration procedure) can be accomplished by either of the following ways: estimation of the wave travel time, from the wave source to the points in the medium, where the image is created; cross correlation of the compressional wave-field with a synthetic wave-field created from the wave source; or cross correlation of the two downward continued, mutually forming each other, wave-fields.

In one practical application of an embodiment of the present invention, based on the first type of migration one can consider five different geological applications.

Example 1

Forecast the Presence of Gas Deposits in Vertical Contacts, in Particular, Salt Domes and Clastic Deposits The amplitudes of the reflected and transmitted waves on the vertical contact of two media are at a fixed incident angle i, however, using common shot gathers, one cannot provide separate images characterized by a constant incident angle at the vertical boundary. Thus the image is formed using the four types of waves and it is useful to keep the incident angle at the sub-vertical boundary constant. Thus, imaging the vertical boundary can be considered the first step in determining medium parameters, so the location and inclination of the sub-vertical boundary, typically unknown, are determined. Once the geometry of the boundary is determined, we proceed to the second stage—determination of Poisson's ratio across the contacting media.

Figure 1:
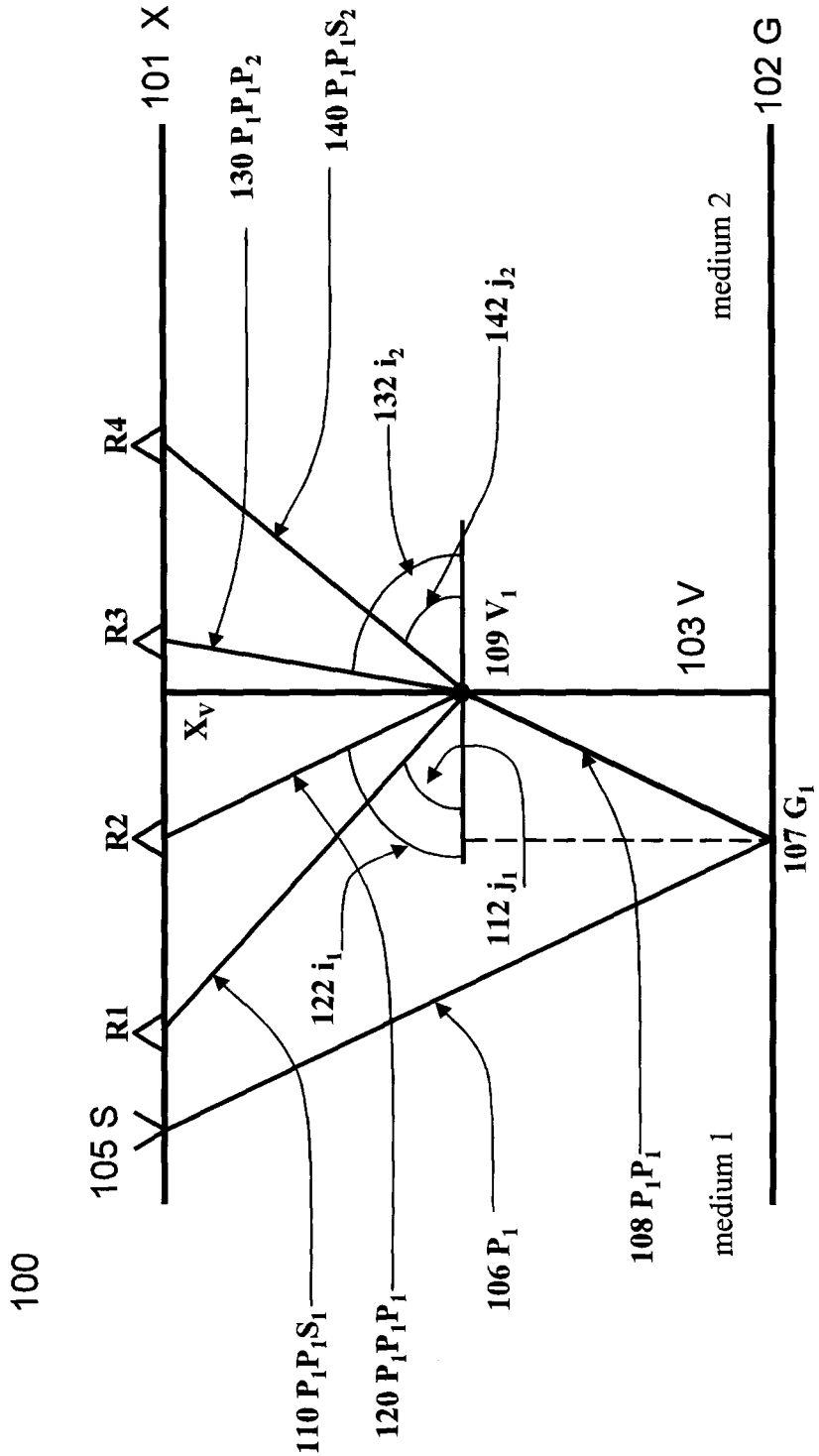
FIG. 1 illustrates reflected and transmitted duplex waves formed on the vertical interface between two media.

Referring now to FIG. 1, as seen in the ray drawing generally denoted as 100, a surface 101 (also denoted as "X") and a horizontal base boundary 102 (also denoted as "G") are shown. Source 105 (also denoted as "S") generates downward traveling compressional wave 106 (also denoted as "$P_1$") that reflects from incidence point 107 (also denoted as "G1") to generate non-converted wave 108 (also denoted as $P_1P_1$). Non-converted wave 108 travels distance G1V1 to point 109 (also denoted as "V1") on vertical interface 103 between medium1 and medium2. Non-converted wave 108 is deflected in at least 4 different ways from vertical interface 103 and recorded at receivers R1, R2, R3, and R4 on surface 101. Reflected converted wave 110 (also denoted $P_1P_1S_1$) is recorded at receiver R1. Reflected non-converted wave 120 (also denoted $P_1P_1P_1$) is recorded at receiver R2. Non-converted transmitted wave 130 (also denoted $P_1R_1P_2$) is recorded at receiver R3. And, converted transmitted wave 140 (also denoted $P_1P_1S_2$) is recorded at receiver R4 with its polarity reversed during deflection from point 109. The image of vertical interface 103 may be formed using the present inventors' DWM methods as taught in U.S. Pat. No. 7,110,323 taking into account reflected converted wave 110 and reflected non-converted wave 120. For downward continuation of reflected non-converted wave 120 the compressional (i.e. longitudinal) velocity of medium1 is used. For downward continuation of reflected converted wave 110 the shear (i.e. transversal) velocity of medium1 is used. To create images of vertical interface 103, by downward continuation of wave-fields, using both reflected converted and reflected non-converted wave types the compressional velocity of medium1 is used.

As seen in FIG. 1:

122 $i_1$ is the angle of reflection of compressional reflected non-converted wave 120 ($P_1P_1P_1$)

132 $i_2$ is the angle of transmission of compressional non-converted transmitted wave 130 ($P_1P_1P_2$)

112 $j_1$ is the angle of reflection of reflected converted wave 110 ($P_1P_1S_1$)

142 $j_2$ is the angle of transmission of converted transmitted wave 140 ($P_1P_1S_2$)

To image vertical interface 103 using the seismogram for source 105 and transmitted waves 130 $P_1P_1P_2$ and 140 $P_1P_1S_2$, execute the following steps:

Firstly, downward continue the wave-field u(x, y, z=0,t) to depth Zi using medium 2 as the referential velocity model for compressional and shear waves respectively. Here i=(1, n) where $$n = \frac{Z_G}{\Delta Z}$$

and $Z_G$ maximum depth of base boundary 102 G, and $\Delta Z$ is the depth step size Secondly, gather the values I=U(X, Y, $Z_i$, $\tau$=$t_1$+$t_2$) from the downward continued field. Here t1+t2 is the travel time of the wave from its generation at source 105, through reflection at base boundary 102 G until reaching point 109 on vertical boundary V (t1=is wave propagation time to base boundary 102 G, t2=time after that). The velocity of the compressional wave in medium1 is used to calculate time T.

New geological tasks in seismic imaging can now be completed using four types of waves: reflected compressional, reflected converted, transmitted non-converted, and transmitted converted. In addition to improving the reliability of imaging sub vertical boundaries of two geological media (e.g. salt-clastic, clastic-reef buildups, etc.), one can also estimate Poisson's ratio in each medium by individually imaging the formation using each of the above types of waves. Assume that on a sub vertical boundary of two media, one medium is a cap rock (example: salt) and the other is a water or gas saturated reservoir or clay. Referencing the last rock to one or other type is based on the analysis of Poisson's ratio, which in gas saturated sandstone fluctuates in the (0.1-0.2) interval, in water saturated sandstone and claystone fluctuates in the (0.3-0.4) interval. The determination of Poisson's ratio in the second medium (cap rock) is used to control accuracy in solving the task. For example: if we know that we are dealing with salt stocks, in which Poisson's ration fluctuates in the (0.2-0.25) interval, a significantly different value for this ratio would indicate that the problem was not solved correctly.

To obtain Poisson's ratio across a geologic interface, the reflection (transmission) coefficients for all four types of waves are first determined. However in seismic exploration we measure amplitudes instead of ratios, these amplitudes are related with the reflection R (transmission B) coefficients with the formula $$R = \frac{A}{C}$$

where:

A—Amplitude of the reflected or transmitted wave,

C—Amplitude of the incident wave, which is unknown and depends on the angle at which the wave was incident to the boundary To make the translation to amplitude in the linearized Zoeppritz's equations, which define the dependence of the reflection and transmission coefficients to the wave's angle of incidence to a boundary (Aki, and Richards, 1980), the right side of the equation is multiplied by factor C.

Assume the change in density in the interface is small in comparison with velocity change, thus $\Delta\rho=\rho_2-\rho_1=0$, where $\rho 1$ and $\rho 2$—are the density of rock on both sides of the interface. For this case the Amplitude linearized Zoeppritz's equations of the reflected and transmitted compressional waves have the following form:

$$R_{PP} = \frac{1}{2\cos^2 i}C\frac{\Delta\alpha}{\alpha} - 4\gamma^2\sin^2 i \cdot C\frac{\Delta\beta}{\beta} \quad (1a)$$

$$B_{PP} = C + \left(\frac{1}{2\cos^2 i} - 1\right)C \cdot \frac{\Delta\alpha}{\alpha} \quad (1b)$$

where RPP and BPP—are the amplitudes of the reflected and transmitted compressional waves respectively $$i = \frac{i_1 + i_2}{2}$$

where 122 $i_1$ and 132 $i_2$ are the above defined angles $$\Delta\alpha = \alpha_2 - \alpha_1, \alpha = \frac{\alpha_2 + \alpha_1}{2},$$

$$\Delta\beta = \beta_2 - \beta_1, \beta = \frac{\alpha_2 + \alpha_1}{2},$$

where $\alpha_1$, $\alpha_2$, $\beta_1$, $\beta_2$—are respectively the velocities of the compressional and shear waves in the first and in the second layer of the two-layer model, $$\gamma = \frac{\beta}{\alpha}$$

Now subtract and add the reflection and transmission coefficients for converted waves among themselves, then take into account the transition to amplitude and we get:

$$R_{PS} - B_{PS} = \frac{4\sin i \sin^2 j}{\cos j} \cdot \frac{\Delta\beta}{\beta}C \quad (2)$$

$$-(R_{PS} + B_{PS}) = 4\sin i \cos i\gamma \cdot \frac{\Delta\beta}{\beta}C \quad (3)$$

where RPS and BPS—are the amplitudes of the reflected and transmitted converted waves respectively. Here $$j = \frac{j_1 + j_2}{2}$$

where 112 $j_i$ and 142 $j_2$ are the above defined angles

Since the wave's angle of incidence $i_1$ is known, and for angles below the critical value, the replacement of the angle i for the incident angle $i_1$ in the linearized Zoeppritz's equations does not cause significant inaccuracy, we can define from (3):

$$-\frac{R_{PS} + B_{PS}}{4\sin i \cos i} = \gamma\frac{\Delta\beta}{\beta} \cdot C = D \quad (4)$$

In view of (3) and (4) and taking in consideration the Snell's law $$\frac{\sin j}{\sin i} = \gamma,$$

we get:

$$R_{PS} - B_{PS} = \frac{4\gamma \sin^3 i \cdot}{\sqrt{1-\gamma^2 \sin^2 i}} D \quad (5)$$

Equation (5) allows determining the value of $\gamma$, which varies within the limits:

$$0 \le \gamma \le \frac{1}{\sqrt{2}}.$$

A typical range of change of this parameter for rocks is $0.3 < \gamma < 0.6$.

Knowing $\gamma$, from (4) we can determine the magnitude $$E = C \frac{\Delta \beta}{\beta} \quad (6)$$

Using known values $\gamma$ and D, from equation (1a) we can determine the magnitude G $$G = C \frac{\Delta \alpha}{\alpha} \quad (7)$$

Next, from the formula for the compressional transmitted wave amplitude $B_{pp}$ (16) we can calculate the amplitude of the incident wave C $$C = B_{PP} - \left(\frac{1}{\cos^2 i} - 1\right) G \quad (8)$$

Having the values of C, E, and G, we can determine the desired parameters $$\frac{\Delta \alpha}{\alpha} \text{ and } \frac{\Delta \beta}{\beta}: \quad (9)$$

$$\frac{\Delta \alpha}{\alpha} = \frac{G}{C}, \frac{\Delta \beta}{\beta} = \frac{E}{C}$$

Since $$\frac{\Delta \gamma}{\gamma} = \frac{\Delta \beta}{\beta} - \frac{\Delta \alpha}{\alpha}, \quad (10)$$

where $\Delta \gamma = \gamma_2 - \gamma_1$, we get the value for, $$\Delta \gamma = \gamma \left( \frac{\Delta \beta}{\beta} - \frac{\Delta \alpha}{\alpha} \right). \quad (11)$$

with the values for $\Delta \gamma$ and $\gamma = (\gamma 1 + \gamma 2)/2$ we can calculate $\gamma 1$ and $\gamma 2$, which can be recomputed in more widespread parameters—Poisson's ratio by the equation $$\sigma = \frac{1}{2}\left(\frac{1-2\gamma^2}{1-\gamma^2}\right). \quad (12)$$

As expected Poisson's ration varies within the limits: $0 < \sigma < 0.5$

Figure 2:
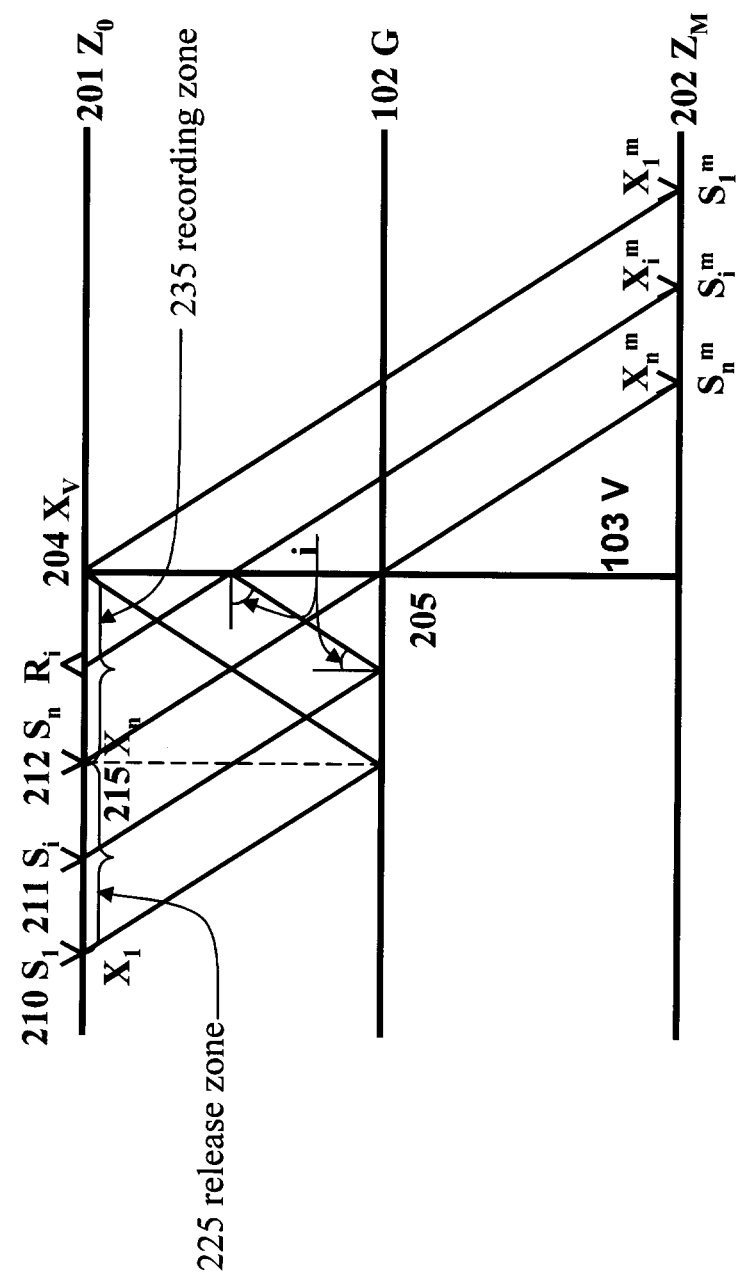
FIG. 2 illustrates the principle of selecting offsets, in presence of a flat reflector, for a constant angle of incidence of a wave to a vertical boundary.

Referring now to FIG. 2, which illustrates the selection of offsets, in the presence of a flat reflector, for a constant angle of incidence of a wave to a vertical boundary, there is shown a vertical interface 103 V between two contacting media and a flat reference layer such as horizontal base boundary 102 (also denoted as "G"). After determining from the previous stage the position of these two layers, we can calculate the position of the shots and receivers corresponding to a fixed incident angle i at the vertical interface 103 with forecasting velocity relations $\alpha_1$, $\beta_1$, $\alpha_2$, $\beta_2$ for all four of the above described types of waves. These velocities correspond to our migration velocity macro-model. As may be seen in FIG. 2, while the shot points (210 $S_1$, 211 $S_i$, 212 $S_n$) are located on line 201 (also denoted $Z_0$) the image source location will be on line 202 (also denoted $Z_M$). First shot point 210 $S_1$ defines the incident angle i at the upper part of vertical interface 103, and is located at distance $L_0 = X_v - X_1$, where point 204 (also denoted $X_V$) is the horizontal coordinate of vertical interface 103. This is the maximum distance ($L_0$) that fixes a duplex wave with an incident angle i at vertical interface 103. Coordinate $X_S^{(M)}$ is the image source coordinate of the shot point coordinate $X_{S1}$. A line drawn from this shot point at an angle i to the horizontal will intersect point 204 $X_V$, which is the starting position for recording duplex waves. Point 215 $X_n$ is the last position at which duplex waves will be recorded and it is located by drawing a line through point 205 with angle i to both the horizontal and to vertical interface 103. In FIG. 2 to the left of point 215 $X_n$ there is an energy release zone 225, while to the right there is a recording zone 235 (for observing compressional reflected duplex waves). Coordinate $X_n^M$ is the image source coordinate of shot point 215 $X_n$ and the layer section $X_n^{(M)} X_1^{(M)}$ is the zone where energy is released by image sources Sn(M)S1(M). Since $X_n X_V = X_n(M) X_1(M)$ then coordinate $$X_n = \frac{X_V - X_1}{2}$$

is the middle between vertical interface 103 and first shot point 210. By moving the shot point a step $\Delta X$ to the right, its corresponding receiver location is displaced distance $\Delta X$ to the left.

Figure 3:
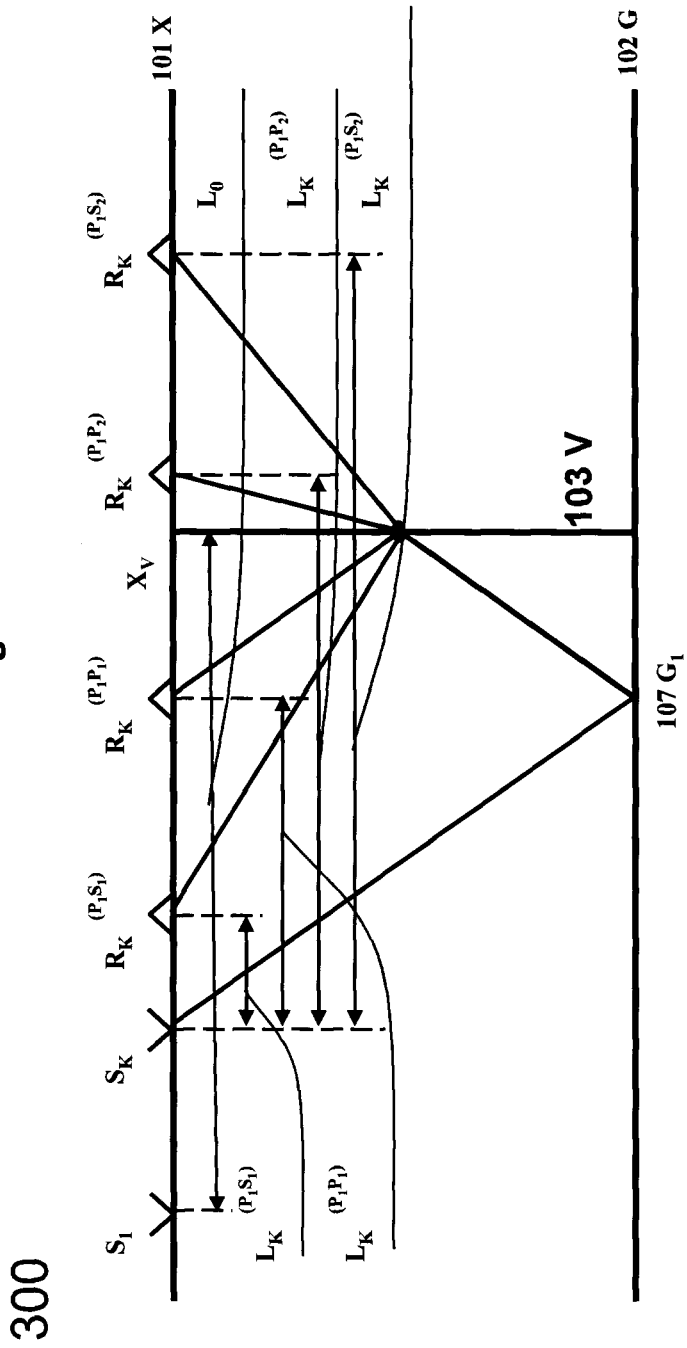
FIG. 3 illustrates the principle of selecting offsets, in presence of a flat reflector, for a constant angle of incidence of a wave to a vertical boundary, when recording reflected and transmitted waves of different polarization.

Referring now to FIG. 3, which illustrates the selection of offsets, in the presence of a flat reflector, for a constant angle of incidence of a wave to a vertical boundary, when observing reflected and transmitted waves of different polarization, the shot-receiver offsets change in accordance with the following rule:

$$L_n^{(P_1 P_1)} = L_0 - 2k\Delta X (k = 0 \ldots n) \; n = \frac{X_n - X_1}{\Delta X} \quad (14)$$

here $L_k^{(P_1 P_1)}$—is the shot-receiver offset when displacing the shot point from position X1 to Xn. L0—distance from the shot point $S_1$ and is equal to $X_r$-$X_1$.

As may be seen in FIG. 3 the offset change rule for converted reflected, compressional transmitted and converted transmitted waves is described as:

$$L_k^{(P_1 S_1)} = L_0 - 2k\frac{\Delta X}{tgj_1}tgi \quad (15)$$

$$L_k^{(P_1 P_2)} = L_0 + 2k\frac{\Delta X}{tgi_2}tgi$$

$$L_k^{(P_1 S_2)} = L_0 + 2k\frac{\Delta X}{tgj_2}tgi,$$

where $L_k^{(P_1 S_1)}$, $L_k^{(P_1 P_2)}$, $L_k^{(P_1 S_2)}$ is the shot-receiver offset for corresponding shot point displacement in the migration of converted reflected, transmitted non-converted and transmitted converted duplex waves correspondingly.

As before, angles $i_2$, $j_1$, $j_2$ are determined by our migration macro-model of the medium. Modeling duplex waves for an elastic medium model should be used to select the shot-receiver offset for more complex shapes of sub-vertical and reference boundaries.

To improve the stability of the image received from each shot point, when migrating duplex waves, is necessary to migrate not only one offset for each shot point (calculated by formulas 14 and 15) but several (e.g. 6 seem to work well) centered in the offset of interest. Since the wave-field continuation procedure is unstable for a small number of shot points, for migration of duplex waves we implement Kirchhoff migration using the following formula:

$$I_f(M) = \int_S G[U_f]ds, \quad (16)$$

where $I_f^{(M)}$—is the seismic image of the sub-vertical boundary, obtained by one of the four types of waves, M—is the spatial coordinate of the medium. G—is the weight of the Kirchhoff integral, $[U_f]=U(S,t-(t_1+t_f))$ $t_1$—is the travel time of the compressional wave emerged from the source Sk, reflected at the reference layer and arrived to the point of the medium $t_f$—is the travel time of the four type of waves from selected (by the above rules) receivers to points of the medium To determine the change in Poisson's ratio vertical interface 103 V, the below operations are followed:
  image vertical interface 103 using the DWM method of U.S. Pat. No. 7,110,323
  using a velocity model that estimates the compressional and shear wave velocities on both sides of vertical interface 103, prepare a correlation table between the incident angles at vertical interface 103 and selection of offsets for specific shot points related to the four type of waves.
  obtain seismic images $I_f(M,i)$, where i—are the compressional incident angles at the boundary, which are identified with the amplitudes of the corresponding waves $R_{PP}$, $R_{PS}$, $B_{PP}$, $B_{PS}$.
  apply the above formulas 3 to 12 and the set of images $I_f(M,i)$, to obtain parameters σ1 and σ2 averaged in the angle range where they are more stable and more characterized with given deflection level.
  based on the magnitude of σ1, oil saturation can be predicted using the limits of analyzed vertical contact. For example, in the case of gas saturated sandstones σ fluctuates in the [0.1÷0.2] interval, for water saturation or shales it fluctuates in the [0.3÷0.4] interval.

Example 2

Imaging a Thin Vertical Layer Interrupting a Given Media

Figure 4:
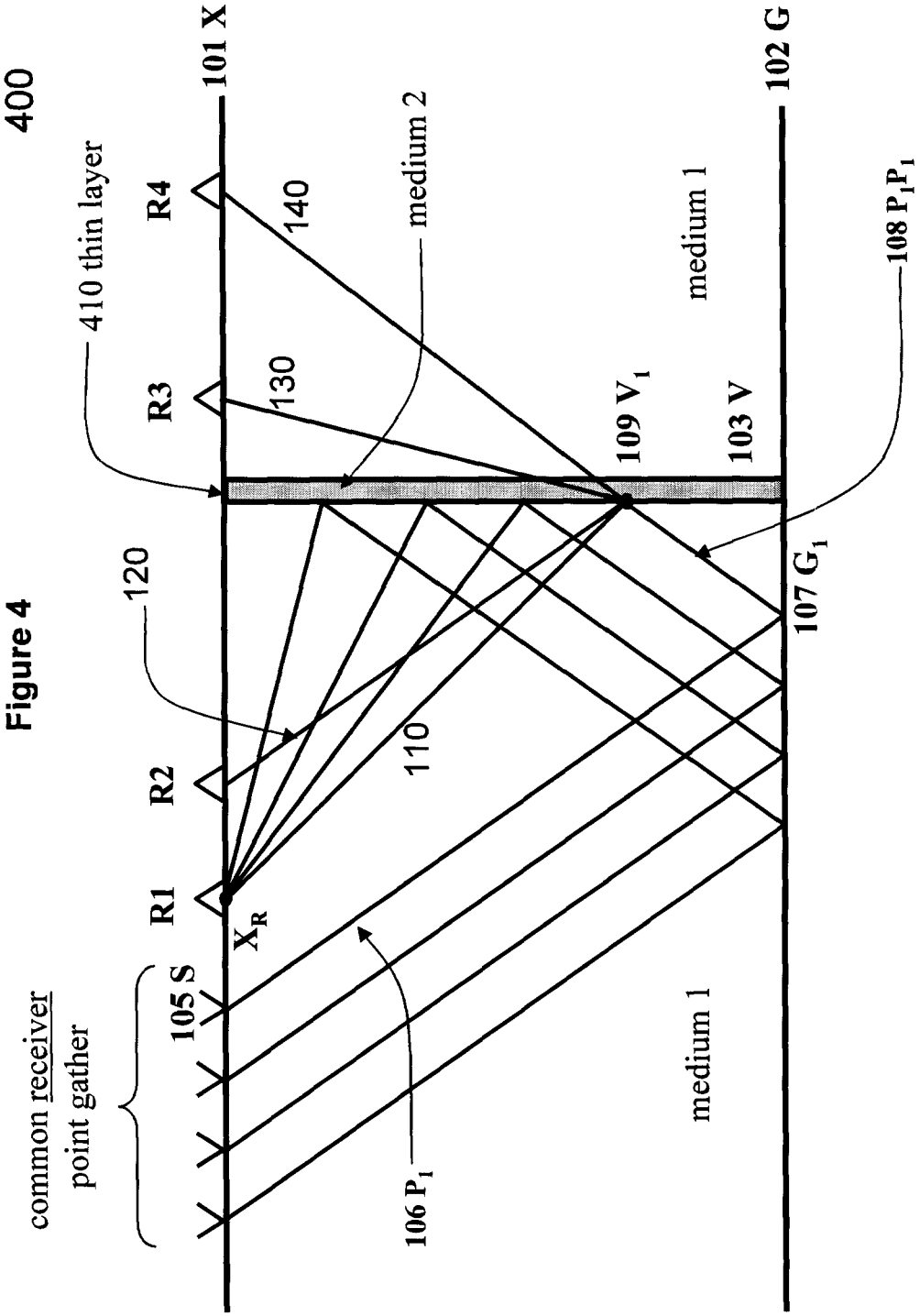
FIG. 4 illustrates ray paths of reflected and transmitted duplex waves formed in a thin vertical layer.

Referring now to FIG. 4 we consider the case of thin vertical layer 410 (e.g. a fractured zone or an intrusion of either salt or igneous rocks, etc.) interrupting a given media. Similar to the manner explained and shown in FIG. 1, a downward traveling wave 106 incident on layer 410 will create four types of waves. Migration of compressional transmitted waves does not assist with this case, since the velocity before and after the sub vertical layer is the same. However, converted transmitted waves do assist us because their velocity differs. Select the seismogram for source 105 S and downward continue it to level $Z_i$ with the shear wave velocity of the medium, ignoring thin vertical layer 410 for the moment due to its small contribution to the velocity model. By applying DWM and selecting the seismic image I with compressional wave velocities we obtain an image of thin vertical layer 410 formed using reflected and transmitted converted waves at the same time. While this procedure can be carried out, one should understand that, depending on the model of the medium, both converted transmitted and reflected waves can change polarity, thereby deteriorating the quality of image due to destructive interference. It also should be considered that when dealing with thin layers the thickness of which is much less than the wave length, the reflection and transmission coefficients become complex and have different phase shifts that affect the quality of the resulting image of the sub vertical layer—such that independent seismic imaging for reflected and transmitted converted waves is important for this first example.

It is also to be understood that the imaging of transmitted and reflected waves differs. The first ones are formed when the image is located in the interval between the shot location and the receiver location, the second ones when the images are formed outside that interval. This distinction is useful when performing the migration of duplex waves.

The migration of reflected converted waves is performed as follows:
  form a common receiver seismogram with coordinates $X_R$,
  downward continue according to DWM its wave-field with the velocities of shear waves,
  form a seismic image outside the limits of this seismogram, in this case to the right of the location $X_R$. The obtained image focus duplex reflected converted waves.

To instead obtain a seismic image based on transmitted converted waves
  use integral (16) to form a seismic image on converted waves for each shot-receiver pair
  select the area for imaging to be between corresponding shot and receiver locations Referring now to FIG. 5 we see a synthetic seismogram displaying duplex waves formed on a thin vertical layer, such as layer 410. Wavefront 501 is reflected from a horizontal base boundary such as 102 G. Reference 502 is a compressional duplex wave, reflected from the nearest, to the source location, border of the vertical layer. Reference 503 is a compressional duplex wave, reflected from the farthest, to the source location, border of the vertical layer. 504 is a converted duplex wave, reflected from the nearest, to the source location, border of the vertical layer. 505 is a converted duplex wave, reflected from the farthest, to the source location, border of the vertical layer. 506 is a transmitted converted duplex wave. 507 is a transmitted compressional duplex wave. 508 and 509 are produced by a converted wave that changed polarization at the base-boundary. 510 are transmitted and reflected waves from the top of the vertical layer, as result of incidence of the initial source wave.

Referring now to FIG. 6 we see an example of imaging a thin layer based on a model, in which thin layer 605 is only 80 m thick. 601 is the model used as input when applying the method of the invention to produce the below 3 images constructed using different types of duplex waves. Image 602 was formed using compressional reflected waves. Image 603 was formed using transmitted converted waves. And, image 604 was formed using reflected converted waves.

Example 3

Imaging Layers Having Arbitrary Dip-Angles

Advantageously, migration of transmitted converted duplex waves can be used to form images of both sub vertical and horizontal layers (i.e. layers of arbitrary dip-angle) having practically an unlimited range of dip angles. As explained above, we select the zone between the shot-receiver locations when using converted transmitted duplex waves for imaging. Images of both sub vertical and horizontal boundaries may be formed simultaneously.

Referring now to FIG. 7 we see an example of seismic imaging based on converted transmitted duplex waves, where image 701 is the model of upward-thinning layer and a number of horizontal discontinuities, and image 702 shows a vertical layer constructed using transmitted converted duplex waves and formed at X=4000M, such that both vertical and horizontal layers correspond to the model. It may be observed in FIG. 7 that artifacts appear close to the vertical layer, thereby complicating the image of the horizontal layers. These artifacts are duplex waves originated at the corresponding angular contact zone between vertical and horizontal layers.

Example 4

Determination of Parameters for an Isotropic Layer in a Homogeneous Background

Figure 8:
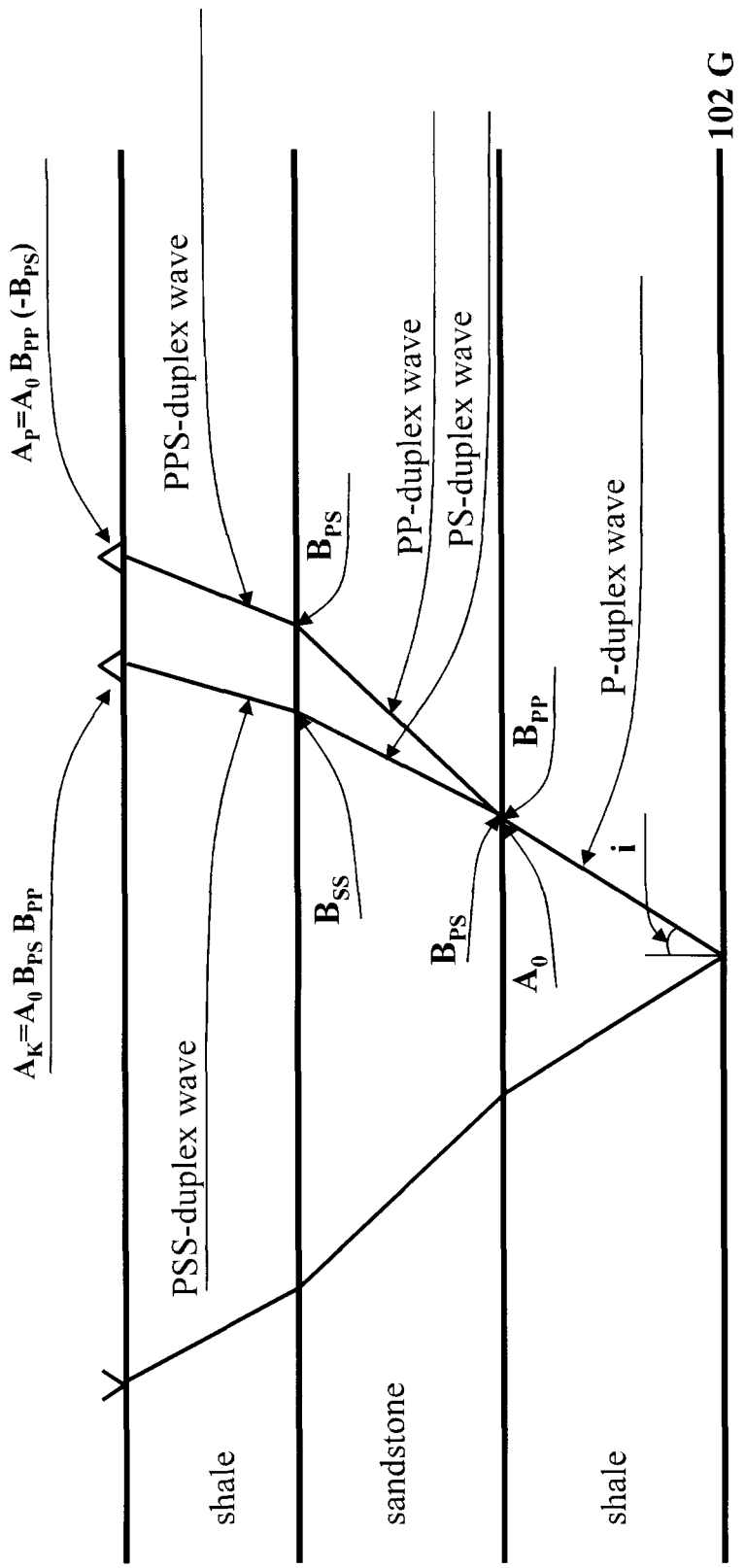
FIG. 8 illustrates the generation of transmitted converted duplex waves in a homogeneous layer within a homogeneous formation.

Referring now to FIG. 8 we see a homogeneous layer intercalated in an isotropic homogeneous medium, such that transmitted converted duplex waves are generated in a homogeneous layer within a homogeneous formation.

The parameters $$\frac{\Delta \alpha}{\alpha}, \frac{\Delta \beta}{\beta} \text{ and } \frac{\Delta \rho}{\rho}$$

at the top as compared to the base of this layer are the same in absolute magnitude, but have opposite sign. The reflection and transmission coefficients of the converted PS waves are the same in absolute magnitude but opposite in sign when the incident angles i of the compressional wave are too close at the top and at the base of the layer. The proximity of these angles, at the top and at the base of the layer, assumes a small velocity contrast of the compressional waves in the layer and in the background medium, which is quite realistic in clastic deposits.

As shown in FIG. 8, AK is the amplitude at the top of the layer of sandstone and its magnitude is represented as:

$$A_K = A_0 \cdot B_{PP} \cdot B_{PS} \cdot C, \quad (17)$$

where $A_0$—is the incident wave amplitude, $B_{PS}$—is the transmission coefficient of the converted wave at the top of the layer, $B_{PP}$—is the transmission coefficient of the compressional wave at the base of the layer, C—uncompensated in migration wave travel path from the layer to the recording surface $A_P$—is the amplitude of the seismic image, obtained on the transmitted converted duplex wave at the base of the layer. It is describes as:

$$A_P = A_0 \cdot (-B_{PS}) \cdot B_{SS} \cdot C, \quad (18)$$

where $B_{SS}$—is the transmission coefficient of the shear waves at the top of the layer.

The relationship $$\frac{A_P}{A_K} = -\frac{B_{SS}}{B_{PP}} \quad (19)$$

depends only on the transmission coefficients of P- and S-waves at the borders of the layer.

By substituting in equation (19) the values $$B_{PP} = 1 - \frac{\Delta \rho_1}{2\rho_1} - \left(\frac{1}{2\cos^2 i} - 1\right)\frac{\Delta \alpha}{\alpha}, \quad (20)$$

$$B_{SS} = 1 - \frac{\Delta \rho_2}{2\rho_2} + \left(\frac{1}{2\cos^2 j} - 1\right)\frac{\Delta \beta}{\beta},$$

where $$\frac{\Delta \rho_1}{\rho_1}$$

is the density contrast at the base of the layer, and $$\frac{\Delta \rho_2}{\rho_2}$$

at the top, which are equal in absolute magnitude, but different in sign, we obtain for $$\frac{A_P}{A_K}$$

in the case of keeping only the first order variables:

$$\frac{A_P}{A_K} = -\frac{1 + \left(\frac{1}{2\cos j} - 1\right)\frac{\Delta\beta}{\beta} - \left(\frac{1}{2\cos^2 i} - 1\right)\frac{\Delta\alpha}{\alpha}}{1 - \frac{\Delta\rho}{\rho}} \quad (21)$$

Applying Snell's law, equation (21) can be rewritten as:

$$\frac{A_P}{A_K} = -\frac{1 + \left(\frac{1}{2(1 - \gamma^2 \sin^2 i)} - 1\right)\frac{\Delta\beta}{\beta} - \left(\frac{1}{2\cos^2 i} - 1\right)\frac{\Delta\alpha}{\alpha}}{1 - \frac{\Delta\rho}{\rho}} \quad (22)$$

The dependence of the parameter $$\frac{A_P}{A_K}$$

on the angle i is achieved with migration of transmitted converted duplex waves within a narrow range of shot-receiver offsets or in the limiting case is based on the migration of common offsets gathers Based on the equation (22) and using least-squares method we can calculate the following parameters:

$$\frac{1}{1 - \frac{\Delta\rho}{\rho}}, \quad \frac{\Delta\beta}{\beta\left(1 - \frac{\Delta\rho}{\rho}\right)} \text{ and } \frac{\Delta\alpha}{\alpha\left(1 - \frac{\Delta\rho}{\rho}\right)}.$$

Having defined the free member in equation (22) we can now determine the required parameters $$\frac{\Delta\rho}{\rho}, \quad \frac{\Delta\beta}{\beta} \text{ and } \frac{\Delta\alpha}{\alpha}.$$

This task can be solved interactively. At the first stage we fix the initial value of parameter γ. Considering its range of change for sedimentary rocks 0.3<γ<0.6, we can select as initial value γ=0.45. The initial value can be corrected based on knowledge of the site.

Considering the initial approximation of the parameter γ and also $$\frac{\Delta\gamma}{\gamma} = \frac{\Delta\beta}{\beta} - \frac{\Delta\alpha}{\alpha}, \quad (23)$$

we can determine the magnitudes $\gamma_1$ and $\gamma_2$ from (23), which determine the magnitude of $\gamma_k$.

Parameter $\gamma_k$ becomes the next initial value and the calculation is repeated again using formula (22). This interactive process is repeated as long as $$|\gamma_k - \gamma_{k-1}| < \epsilon,$$

where ϵ—given in advance small quantity defining the accuracy of the solution.

$$\frac{\Delta\gamma}{\gamma}$$

This parameter indicates gas saturation, it is close to zero in a shale-water saturated sandstone contact and it changes between 0.3÷0.4 in a gas saturated sandstone—shale contact. Parameters $\gamma_1$ and $\gamma_2$ can also be analyzed separately.

Determination of parameter $$\frac{\Delta\gamma}{\gamma}$$

based on transmitted converted waves is advantageous as compared to using reflected compressional waves (as described by Smit and Gidlow 1987), since in the last case any departure from the incident angle range [0 to 20°] can lead to significant errors. In the case of transmitted converted waves the incident angle range is wider, thus increasing the statistical effect of solving equation (22).

The lateral change of properties in the target layer and in the background medium is considered by determining the change of the required parameters along the project line or area.

Example 5

Determination of Anisotropy Parameters for a Vertically Faulted Layer in a Homogeneous Background In order to determine anisotropy parameters, assume that the layer shown in FIG. 8 is vertically faulted, which will lead to an azimuthally-dependent anisotropy.

Referring now to FIG. 9 we see cross-plots between reflected and transmitted coefficients of the compressional and converted waves, the compressional angle of incidence at the layer and the azimuth of fault heading relative to the recording line. The model used was a two-layer medium with the following parameters:

$\rho_1$=2100 Kg/M3, $\alpha_1$=1950 m/s, $\beta_1$=650 m/s, $\epsilon_1$=0.13, $\delta_1$=0.05, $\rho_2$=2300 Kg/M3, $\alpha_2$=2742 m/s, $\beta_2$=1371 m/s, $\Delta_N$=0.3, $\Delta_T$=0.05

Where $\epsilon_1$ and $\delta_1$ are Thomson's parameters in the upper half-space, $\Delta_N$ and $\Delta_T$ are parameters that make the correction for fractures in an elastic matrix (Bakulin, 2000). Fracture properties such as fracture density, fluid or solid matter infill and others are determined by the interrelation of parameters $\Delta_N$ and $\Delta_T$.

Knowing the orientation of the recording line relative to the fracture plane direction is useful, since when the recording line is oriented in-line with the fracture plane, fractures do not affect the transmission and reflection coefficients, but when the recording line is oriented crossline, the effect on the coefficients reaches its maximum. The analysis of graphs such as those shown in FIG. 9 indicates that in the case of compressional transmitted and reflected waves the influence of such fractures begins in the supercritical angle zone, close to 50 degrees in this example (see graphs 901 and 902), which fact significantly reduces the transmission distance.

According to graph 903, advantageously for transmitted converted waves, the effect of fractures may observed for incident angles around 20 degrees, moreover the transmission coefficient for the in-line direction is approximately 4 to 10 times greater than that in the cross-line direction within an angle range of about 20-50 degrees. However, based on reflected converted waves (see graph 904) this difference is only 1.5 times. Consequently it is very productive to determine fracture parameters using transmitted converted PS waves.

The transmission coefficient of the PS wave on the border of this layer is:

$$B_{PS} = B_{PS}^i + B_{PS}^a \quad (24)$$

where: $B_{PS}^i$—Transmission coefficient for a rock without fractures.

$B_{PS}^a$—Addition to the transmission coefficient of the converted wave due to fractures.

If the recording line is oriented in-line to the fracture plane, then:

$$B_{PS} = B_{PS}^i \quad (25)$$

and the rock matrix parameters are determined based on the above described method using formula (22).

If the recording line is oriented cross-line to the fracture plane, then $B_{PS}$ is described with the equation (24).

Considering that for an actual angle range, the coefficient $B_{PS}$ has its greatest contrast when the recording line is oriented in-line and crossline to the fracture plane, transmitted converted PS waves are useful to determine the orientation and parameters of the fracture.

The expression for $B_{PS}^a$ under the smallness condition of parameters $\Delta_N$ and $\Delta_T$ is given by:

$$B_{PS}^a = -\frac{\beta}{\alpha} \cdot \frac{\sin j \left(1 - 2\frac{\beta^2}{\alpha^2}\cos^2 i\right)}{\cos j - \frac{\beta}{\alpha}\cos i} \Delta_N - \frac{\beta}{\alpha} \cdot \frac{\sin i \cos i (1 - 2\sin^2 j)}{\cos j \left(\cos j - \frac{\beta}{\alpha}\cos i\right)} \Delta_T \quad (26)$$

Select a common offset seismogram that assures a duplex wave's incident angle i at the target horizon, and apply a duplex converted transmitted wave migration to that seismogram.

The imaging amplitude at the top or at the base of the layer is:

$$A_{PS} = D \cdot \begin{pmatrix} k_\rho(i, \gamma)\frac{\Delta \rho}{\rho} + k_\beta(i, \gamma)\frac{\Delta \beta}{\beta} + \\ k_{\Delta_N}(i, \gamma)\Delta_N + k_{\Delta_T}(i, \gamma)\Delta_T \end{pmatrix}, \quad (27)$$

where $$k_\rho(i, \gamma) = \frac{\sin i}{2\sqrt{1 - \gamma^2 \sin^2 i}} - \frac{\gamma^2 \sin^3 i}{\sqrt{1 - \gamma^2 \sin^2 i}} - \frac{\gamma \sin 2i}{2},$$

$$k_\beta(i, \gamma) = -\left(\frac{2\gamma^2 \sin^3 i}{\sqrt{1 - \gamma^2 \sin^2 i}} + \gamma \cdot \sin 2i\right),$$

$$k_{\Delta_N}(i, \gamma) = -\frac{\gamma^2 \sin i(1 - 2\gamma^2 \cos^2 i)}{\sqrt{1 - \gamma^2 \sin^2 i} - \gamma \cdot \cos i},$$

$$k_{\Delta_T}(i, \gamma) = -\frac{\gamma \sin i \cos i (1 - 2\gamma^2 \sin^2 i)}{\sqrt{1 - \gamma^2 \sin^2 i}\left(\sqrt{1 - \gamma^2 \sin^2 i} - \gamma \cos i\right)},$$

$$D = A_0 \cdot B_{PP} \cdot C,$$

A0 is the amplitude of the incident wave, related to the selected common offset seismogram, $\gamma = \beta/\alpha$, $B_{PP}$ is the transmitted coefficient of the compressional wave, C is a coefficient that accounts for the amplitude variation of the wave on its propagation from the top of the layer to the receivers.

Equation (27) obtained from the linearized Zoeppritz's equation of the converted PS waves and formula (26) change of variables $\sin j = \gamma \sin i$.

The values of the transmission coefficient $B_{PP}$ (FIG. 9a), signal amplitude A0 and coefficient C in the sub-critical domain, practically, don't depend on the angle of incidence i of the compressional wave. Therefore, we consider them constant.

Implement the following operations in order to determine parameters $\Delta_N$, $\Delta_T$, $\gamma$:

determine the orientation where the images have their maximum and minimum value, by selecting the azimuthal direction of the recording line during the migration of the transmitted converted duplex waves. The maximum value will correspond to the cross-line orientation to the fracture plane; the minimum value will correspond to the inline orientation.

fix the line orientation in-line to the fracture plane and based on the procedure described in the Example 3 determine parameters $$\frac{\Delta \rho}{\rho}, \frac{\Delta \beta}{\beta} \text{ and } \frac{\Delta \alpha}{\alpha}.$$

fix the line orientation cross-line to the fracture plane. For each common offset seismogram, create an image from the converted PS waves and determine the amplitudes related to the top of the layer $A_{PS}$ For each value of the $\gamma$ parameter from a fixed range and for all angles i (corresponding to selected common offsets), arrange the equation (27)

Solve the obtained linear set of equations by using the least square method in unknowns $$x_1 = D \cdot \frac{\Delta \rho}{\rho}, \quad x_2 = D \cdot \frac{\Delta \beta}{\beta}, \quad x_3 = D \cdot \Delta_N, \quad x_4 = D \cdot \Delta_T.$$

Among the solutions of the set of equations for different values of $\gamma$ parameter, select the one, for which deviation $$\left|\frac{x_1 \rho}{\Delta \rho} - \frac{x_2 \beta}{\Delta \beta}\right|$$

is the least and determine the value D from equation $$D = \frac{1}{2}\left(\frac{x_1 \rho}{\Delta \rho} + \frac{x_2 \beta}{\Delta \beta}\right).$$

Values for $$\frac{\Delta \rho}{\rho} \text{ and } \frac{\Delta \beta}{\beta}$$

are determined in step 2.

Determine the values of $\Delta_N$ and $\Delta_T$ from the equations $$\Delta_N = \frac{x_3}{D}, \quad \Delta_T = \frac{x_4}{D}.$$

interpretation of the properties of vertical faulting is based on the magnitude of parameters $\Delta_N$ and $\Delta_T$.

The parameters $\Delta_N$, $\Delta_T$, $\gamma$ obtained from the above-described procedure, can be related, likewise to reflected-converted waves, by using the following equation:

$$R_{PS}^a = \frac{\beta}{\alpha} \cdot \frac{\sin j \left(1 - \frac{2\beta^2}{\alpha^2} \cdot \cos^2 i\right)}{\cos j + \frac{\beta}{\alpha}\cos i} \Delta_N - \frac{\beta}{\alpha} \cdot \frac{\sin i \cos i (1 - 2\sin^2 j)}{\cos j \left(\cos j + \frac{\beta}{\alpha}\cos i\right)} \Delta_T. \tag{28}$$

If converted transmitted and converted reflected PS waves are available, they can be used simultaneously, thus, increasing the noise stability of the method.

To determine $\Delta_N$, $\Delta_T$, $\gamma$ parameters from converted reflected PS waves, it is necessary to build a migration image by using converted reflected PS waves for different selections of common offsets, and it is also necessary to arrange the line direction inline and cross-line to the fracture plane, and then complete the steps 1-7 described above. This includes, creating and solving the set of equations (27).

The following coefficients should be used in the equations (27) when using the converted reflected PS waves.

$$k_\rho(i, \gamma) = -\frac{\sin i}{2\sqrt{1 - \gamma^2 \sin^2 i}} + \frac{\gamma^2 \sin^3 i}{\sqrt{1 - \gamma^2 \sin^2 i}} - \frac{\gamma \sin 2i}{2},$$

$$k_\beta(i, \gamma) = \frac{2\gamma^2 \sin^3 i}{\sqrt{1 - \gamma^2 \sin^2 i}} - \gamma \cdot \sin 2i,$$

$$k_{\Delta_N}(i, \gamma) = \frac{\gamma^2 \sin i (1 - 2\gamma^2 \cos^2 i)}{\sqrt{1 - \gamma^2 \sin^2 i} + \gamma \cdot \cos i},$$

$$k_{\Delta_T}(i, \gamma) = -\frac{\gamma \sin i \cos i (1 - 2\gamma^2 \sin^2 i)}{\sqrt{1 - \gamma^2 \sin^2 i} \left(\sqrt{1 - \gamma^2 \sin^2 i} + \gamma \cos i\right)},$$

$$D = A_0 \cdot C.$$

The second type of migration

Figure 10:
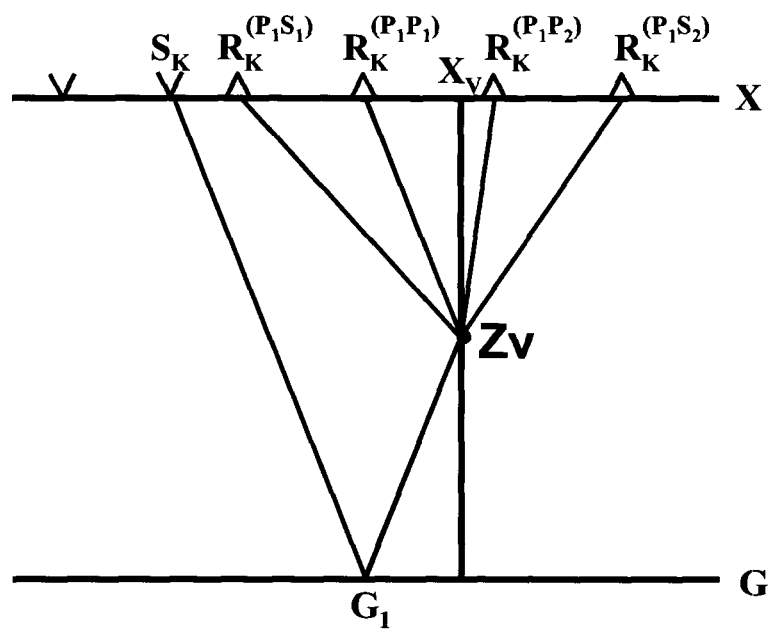
FIG. 10 illustrates the formation of transmitted and reflected compressional and converted PS-waves on discontinuities in a geologic medium.
Figure 11:
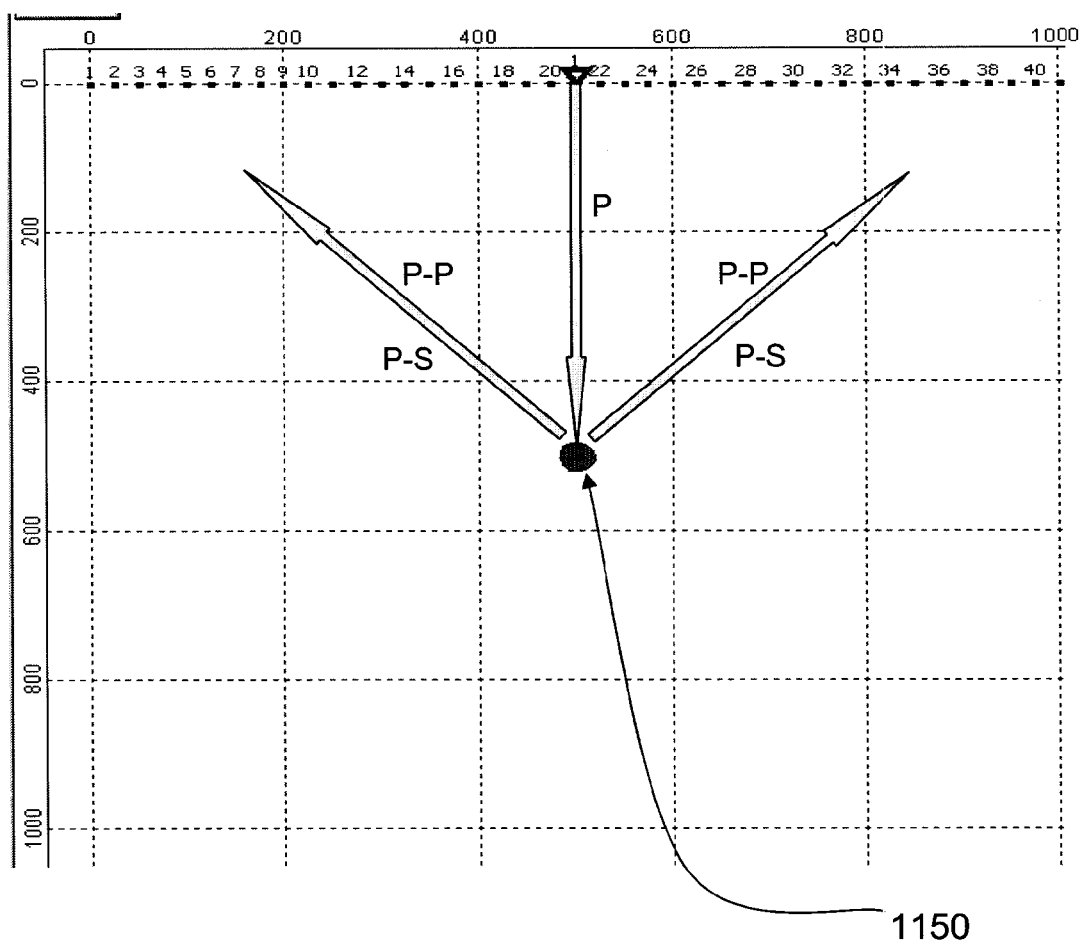
FIG. 11 illustrates a model in which PP and PS waves are created by P-waves deflecting against a point (i.e. rather than a planar layer or line) discontinuity.

The second type of "transmission supplemented" migration uses two wave-fields, for example P and PS, that mutually form each other and are deflected in one and the same points. These wave-fields change type or "convert" when they deflect from such inhomogeneties. It is realizing principle of interferometry for case of generation and receiving of seismic waves on the surface. Referring now to FIGS. 10 and 11 we see an example of such point deflection which may also be studied as a point along a sub vertical boundary. In order to perform this embodiment of the migration of the present invention, two mutually forming wave-fields are used. They can be either transmitted or converted wave-fields, where the shear-wave-field is formed due to the conversion of the compressional P-wave on various non-homogeneities of the geological media. Hence, these are converted PS-waves. Similarly, we can apply converted SP-waves. For simplicity's sake, consider first the example when the P and S-waves are separated. Such separation is typical for observations with a significant low velocity zone near the surface. In this case, all waves propagate vertically up toward the observation surface. As a result, on the Z-component, mostly P-waves would be recorded, on X-component mostly $S_V$ waves are recorded, and on Y component—$S_H$-waves would be recorded. Consider Z and X-components. Reflected and transmitted converted waves would be recorded on the X component and these waves can be returned to the inhomogeneous points that originated them, by using downward wave-field continuation. To do this, it is sufficient to have the velocity model, obtained from the shear waves, for the media cross-section located above these points.

Advantageously, it is not necessary to know the velocities in the lower part of the cross-section where the first reflection took place. Due to the same line of reasoning, we do not require knowledge of the velocities on the interval between the shot point and the points of the first reflection. Meaning, the requirements for the exactness of the velocity model is significantly lower then in many other migration methods, since many migration techniques—especially reverse time migration—require a very detailed velocity model. A velocity model requires some knowledge of the geological strata, so "in order to get the answer you need to know the answer". There are a lot of very advanced migration methods that require very exact velocity model and thus, the utility of their algorithm is reduced. The fact that the migration method of the invention does not require a precise or detailed velocity model is a huge advantage.

Consider the case of compressional P-waves that would be recorded on the Z-component and take them back to the inhomogeneities that generated them, by downward continuing the wave-field. For this we use the P-wave velocity model above these non-homogeneities. One property of this P-wave-field is that in those points of non-homogeneities (where the conversion occurred) the arrival times of the P-waves and the converted PS-waves are the same—so we downward continue the Z and X component of the wave-field (common shot based) and at each Zi step we cross-correlate the continued fields, using the equation $$F(Xi,Zi)=\Sigma\omega Uxi(Xi,Zi,\omega)\cdot Uzi^*(Xi,Zi,\omega), \tag{29}$$

Where, * indicates complex conjugation, ω-signal frequency, Uxi(Xi, Zi, ω) and Uzi(Xi, Zi, ω)—continued wave-fields in the spectral domain, which gives us the seismic image of the medium F(Xi,Zi) in that level (Zi). In the construction of this image, all types of compressional and converted waves, such as: converted and non-converted duplex transmitted and reflected waves are used. Furthermore, seismic images will be obtained from primary reflections monotipic and converted waves since the properties of the wave front separation into compressional and converted waves is the same at these points of non-homogeneity.

When migrating the given PS-waves recorded on the H-component, it is necessary to take into account, that PS-wave which sign for the slowness vector is changing (the sign of an angle of a wave incidence on a supervision surface), is inverting phase of a seismic signal. In this case it is necessary to carry out procedure of reduction of H-component to the same sign. The Specified procedure assumes:

Transition from spatial X-T variables to spectral F-K variables by means of two-dimensional Fourier transformation of seismograms;

The analysis of a sign a K variable;

Change of a sign on components of a spectrum, sign K which it is negative;

Transition to X-T to variables by means of the inverse Fourier transformations.

A person of skill in the art would understand that wave-field downward continuation can be performed various ways, including without limitation: wave-field solution in the spectral domain, finite-difference solution of the one-way and two-way (Reverse Time) wave equation, and the Kirchhoff integral approach. However, when using Reverse Time Migration, one needs to account non-reflective boundaries that don't exist in this example. On the contrary, the presence of reverse reflections allows multiples of reflections to participate in the seismic imaging process, thereby improving the signal to noise ratio of the method of the invention.

In such a way, when the compressional and converted PS waves are fixed in the Z and X components, respectively, or when any other way is used to separate these waves, and is applied procedure of X-component reduction to the same sign, an alternative method of seismic imaging is proposed by using reflected and transmitted monotypic and converted waves, the method comprising the steps:

i) downward continue the wave-field recorded in the X-component, to level $Z_i$ where i=1,n using the velocity distribution of the shear waves and obtain the field $U_{xi}$;

ii) downward continue the wave-field recorded in the Z-component, to level $Z_i$ where i=1,n using the velocity distribution of the compressional waves and obtain the field $U_{zi}$;

iii) obtain the seismic image at level $Z_i$ by cross correlating $U_{xi}$ and $U_{zi}$ wave-fields iv) move to the next depth level and repeat steps i), ii), and iii); and v) construct the full seismic image by combining the images of compressional and converted PS waves, from level 1 through n.

Due to a significant difference in velocities between compressional and shear waves one can obtain an image of good quality, even in those cases where the compressional and the shear waves were recorded for the same component. Then, in steps i) and ii) of the above migration procedure should be used the same wave-field.

It is important to mention that in order to accomplish this method of migration, it is not necessary to use the wave-fields of the compressional and converted waves, as it was described above. They could be any two wave-fields of different types that are just associated by having common points of reflection and transmission. The selection of these wave-fields allows obtaining migration procedures with new useful properties. For example, let's create two fields, the first one by downward continuing the common shot gather with the compressional waves' velocities, and the second one by upward continuing the same gather with the compressional waves' velocities of a medium arranged, symmetrically, to that of the real velocity model.

The cross correlation of both wave-fields formed at calculation levels $Z_{i+}$ and $Z_{i-}$ (which correspond to the level higher and lower to the surface, respectively), create the seismic image of the analyzed medium.

In this case, primary reflections from all interfaces of the medium, provide an image as a result of their cross correlation with the two-fold reflected (from the surface) waves. In return, the two-fold reflected waves provide an image from all interfaces of the medium, as a result of their cross correlation with the three-fold reflected waves and etc. Herein, the noise related with multiple reflection waves won't be seen in the seismic images.

Figure 12:
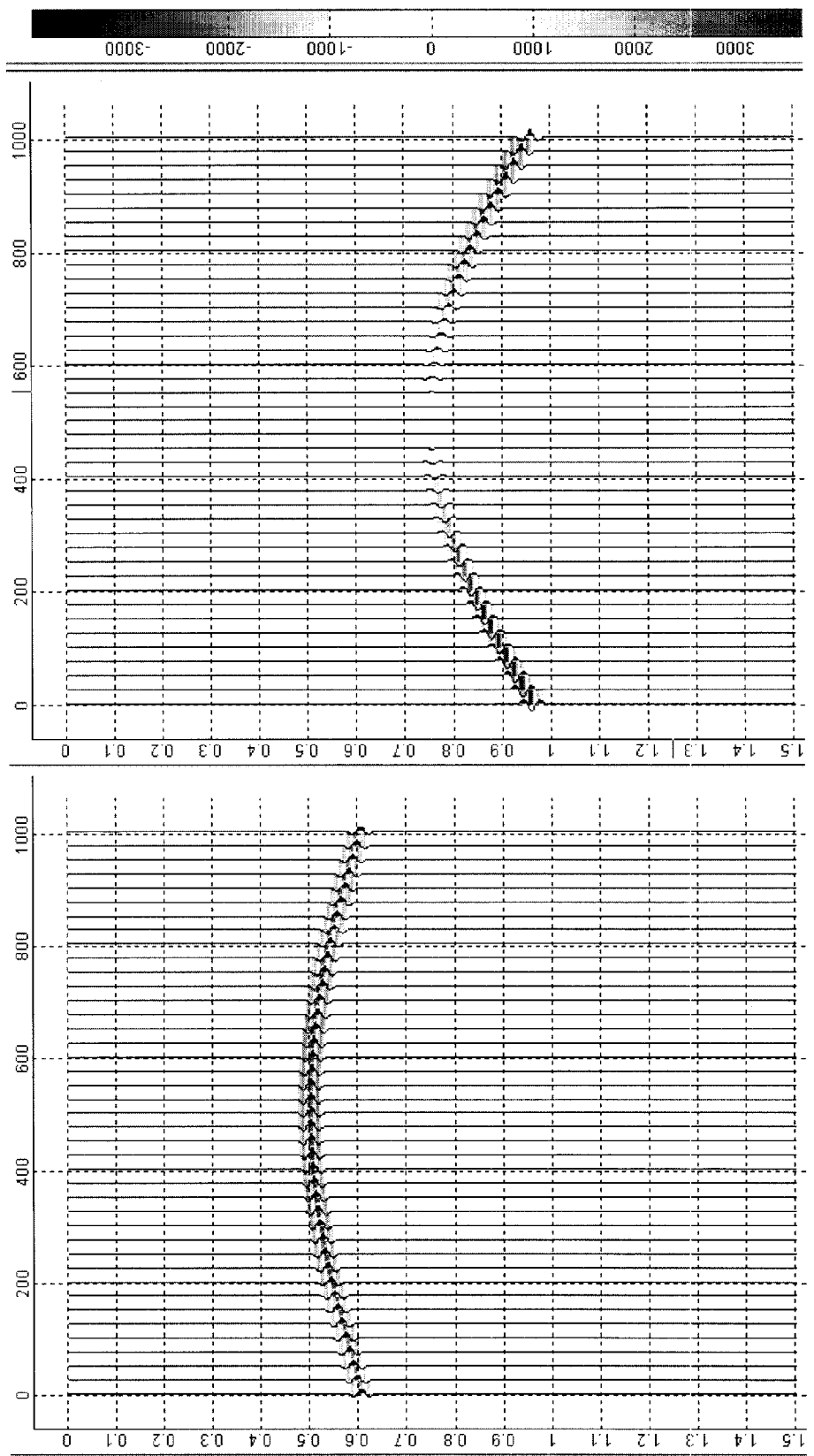
FIG. 12 illustrates two seismograms obtained from a deflecting point model like that of FIG. 11 based on common shot gathers (assuming P is a compressional wave front traveling with velocity vp==:2000 m/s), where 1210 displays a deflected wave front that did not change polarity and continued traveling with a velocity vp=2000 m/s after deflection; and 1220 displays a deflected wave front that was converted and changed velocity to vs=1000 m/s.

Referring now to FIGS. 11 to 13 inclusive we see an example of the results of performing the above method. In FIG. 11, a model shows deflection from point deflector 1150 rather than a plane or line. PP and PS waves are created using seismic energy excitation with a P-wave.

As seen in FIG. 12, images based on two common shot gathers are displayed for sources with coordinates $X_{sp}=500$ m and $Z_{sp}=0$ m and signals originating in deflection points with coordinates $X_{difr}=500$ m and $Z_{difr}=500$ m—for compressional waves traveling with a velocity $V_p=2000$ m/s. Image 1210 displays deflected waves that did not change their polarity and continued traveling with a velocity $V_p=2000$ m/s after deflection. Whereas Image 1220 displays converted deflected waves that changed their traveling velocity to $V_s=1000$ m/s. The X-component change of sign of polarity on both sides of the inhomogeneity is considered when constructing the wave-field of the PS-wave of Image 1220.

In FIG. 13 an image of model point deflector 1150 is imaged as deflector 1350 and the results of migration are clearly in conformity with that model.

Referring now to FIG. 14 there is provided a flowchart describing a method of processing seismic data from an array of receivers on the surface of a formation having at least one base-boundary and a first and second media with a source located over said first media, for imaging a sub vertical interface between said first and second media, the method comprising the steps:

select a common shot point gather;

downward continue the transmitted compressional wave-field of said gather using the compressional wave velocities of the second media;

calculate the arrival times of the reflected wave from said base-boundary, using the compressional wave velocities of the first media;

create a first seismic image on each level $Z_i$ by selecting the values from said continued wave-field, corresponding to said arrival times;

downward continue the transmitted converted wave-field of said gather using the shear wave velocities of the second media;

calculate the arrival times of the reflected wave from said base-boundary, using the compressional wave velocities of the first media;

create a second seismic image on each level $Z_i$ by selecting the values corresponding to the arrival times of the reflected wave from the base-boundary; and compare said first and second seismic images to interpret the location of the vertical interface between said first and second media.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Although the disclosure describes and illustrates various embodiments of the invention, it is to be understood that the invention is not limited to these particular embodiments. Many variations and modifications will now occur to those skilled in the art of seismic data processing. For a further definition of the scope of the invention, reference is to be made to the appended claims.

We claim:

1. A method for imaging a thin near-vertical layer, the method comprising the steps:

i) selecting a common shot gather;

ii) creating a seismic image of a near-vertical layer outside of a source-receiver zone, by applying a duplex Kirchhoff migration to reflected-converted waves;

iii) creating a seismic image of the near-vertical layer inside of the source-receiver zone, by applying the duplex Kirchhoff migration to reflected-transmitted converted waves; and comparing the seismic images obtained in steps ii) and iii).

2. The method of claim 1 wherein, based on migration of reflected-transmitted converted waves for eliminating limits to an angle of inclination of a target interface, the method comprising the further step of imaging discontinuities on which upward traveling reflected waves are converted.

* * * * *